US011027229B1

(12) United States Patent
Strait, III

(10) Patent No.: US 11,027,229 B1
(45) Date of Patent: Jun. 8, 2021

(54) ACTIVATED HEMP FILTERS AND METHOD OF MAKING ACTIVATED HEMP FILTERS

(71) Applicant: Hemp-Shire LLC, Berea, KY (US)

(72) Inventor: William D. Strait, III, Berea, KY (US)

(73) Assignee: Hemp-Shire LLC, Berea, KY (US)

( * ) Notice: Subject to any disclaimer, the term of this patent is extended or adjusted under 35 U.S.C. 154(b) by 0 days.

(21) Appl. No.: 16/193,570

(22) Filed: Nov. 16, 2018

Related U.S. Application Data

(60) Provisional application No. 62/587,781, filed on Nov. 17, 2017.

(51) Int. Cl.
*B01D 39/16* (2006.01)
*B01D 39/20* (2006.01)
*D21H 11/12* (2006.01)
*D21H 13/08* (2006.01)

(52) U.S. Cl.
CPC ......... *B01D 39/16* (2013.01); *B01D 39/1638* (2013.01); *B01D 39/1646* (2013.01); *B01D 39/20* (2013.01); *D21H 11/12* (2013.01); *D21H 13/08* (2013.01)

(58) Field of Classification Search
None
See application file for complete search history.

(56) References Cited

U.S. PATENT DOCUMENTS

| | | | | | |
|---|---|---|---|---|---|
| 3,870,495 | A | * | 3/1975 | Dixson | B01D 46/0043 55/489 |
| 5,750,026 | A | * | 5/1998 | Gadkaree | B01D 39/2003 210/502.1 |
| 6,533,847 | B2 | * | 3/2003 | Seguin | B01D 53/0415 55/518 |
| 7,160,369 | B2 | * | 1/2007 | von Blucher | A62D 5/00 55/DIG. 33 |
| 2003/0200868 | A1 | * | 10/2003 | Koslow | A01N 25/34 95/285 |
| 2006/0243134 | A1 | * | 11/2006 | von Blucher | B01J 20/3236 95/90 |
| 2007/0080103 | A1 | * | 4/2007 | Mitchell | B01D 39/2058 210/263 |
| 2013/0018112 | A1 | * | 1/2013 | Thielemans | C08J 9/0066 514/781 |

OTHER PUBLICATIONS

Teng et al. (Ind. Eng. Chem. Res., 1998, 37, 58-65). (Year: 1998).*
William D. Strait, III. "Public Health Hazard—Water Quality: Can low-cost hemp improve water quality", academic paper submitted to Eastern Kentucky University. Dec. 14, 2016.
Chen Chen. "Bromide Removal from Surface Waters by Silver Impregnated Activated Carbon", thesis submitted to Clemson University. 2015.

* cited by examiner

*Primary Examiner* — Clare M Perrin
(74) *Attorney, Agent, or Firm* — Dinsmore & Shohl LLP

(57) ABSTRACT

A method of making activated carbon particles from hemp includes placing raw hemp within a predefined atmosphere to produce activated carbon particles from the raw hemp and carbonizing the raw hemp to produce the activated carbon particles. Hemp filters including the activated carbon particles from hemp are disclosed.

17 Claims, 13 Drawing Sheets

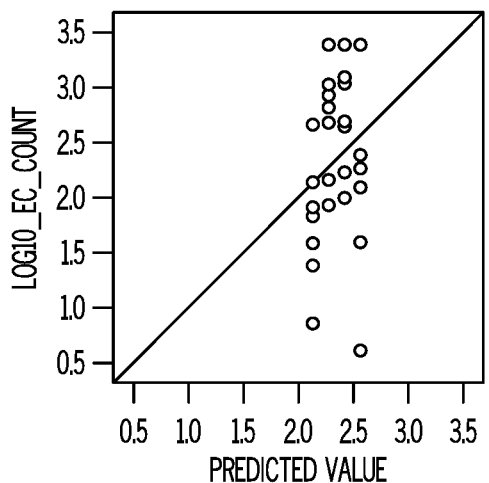
FIG. 9E
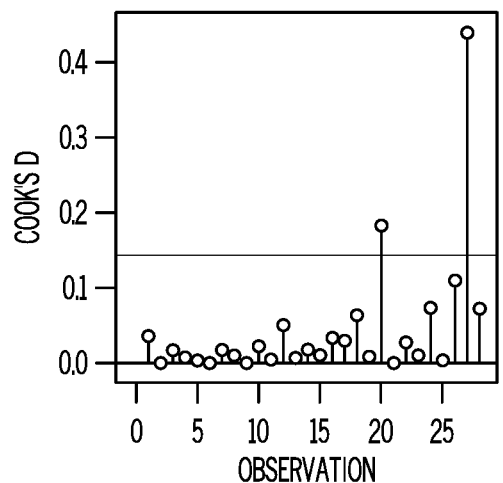
FIG. 9F
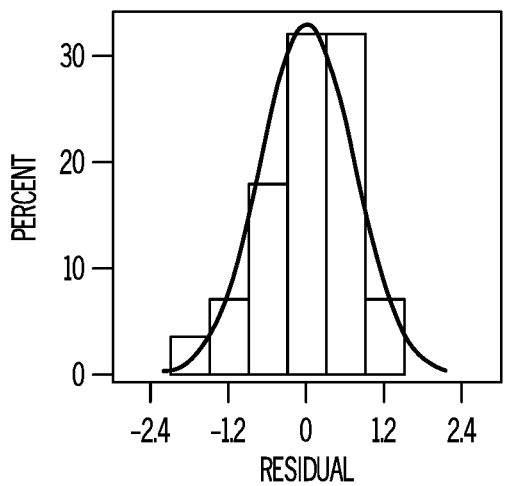
FIG. 9G
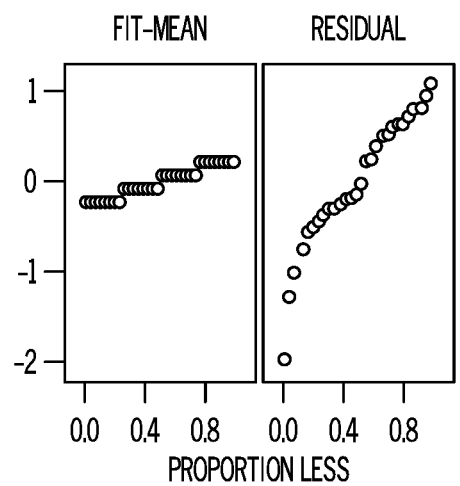
FIG. 9H
| OBSERVATIONS | 28 |
| --- | --- |
| PARAMETERS | 2 |
| ERROR DF | 26 |
| MSE | 0.5447 |
| R-SQUARE | 0.0486 |
| ADJ R-SQUARE | 0.012 |
FIG. 9I

ACTIVATED HEMP FILTERS AND METHOD OF MAKING ACTIVATED HEMP FILTERS

CROSS-REFERENCE TO RELATED APPLICATION

This non-provisional patent application claims the benefit under 35 U.S.C. § 119(e) of U.S. Provisional Patent Application Ser. No. 62/587,781, entitled ACTIVATED HEMP FILTERS AND METHOD OF MAKING ACTIVATED HEMP FILTERS, and filed Nov. 17, 2017, the entire disclosure of which is hereby incorporated by reference herein.

BACKGROUND

Field

The present disclosure generally relates to bio-based particulate filters and, more specifically, to filters including activated hemp.

Technical Background

Certain filtering technologies, particularly chemical-based filtering technologies (e.g., technologies that use activated carbon impregnated with various chemicals), may contain materials that could have detrimental effects if or when filtered content (e.g., fluids) are consumed. In addition, with respect to chemical-based filtering technologies, a lag time of several years (e.g., 25 years or more) may exist before the health effects on humans can be discerned. As such, a bio-based filtering technology is desired that is not only effective in removing particulate matter from fluids (e.g., water, air, fuels, etc.) but also safer for human health relative to chemical-based filtering technologies.

In addition, the carbon of traditional carbon-based filters is derived from coal, a non-renewable resource. More specifically, coal is a fossil fuel, a natural resource that takes thousands of years (e.g., with the aid of necessary heat and pressure) to form naturally from organic materials. As such, coal does not renew itself at a sufficient rate for sustainable economic extraction. In this vein, coal and carbon derived therefrom, will eventually become too costly to harvest thus increasing the price of carbon-based filtering technologies. As such, it is desirable to find a renewable resource that provides a material usable in filtering technologies. Such a renewable resource would renew itself at a sufficient rate for sustainable economic use in filtering applications. Furthermore, such a renewable resource would also be scalable to fulfill current and future demands at reasonable prices.

Lastly, spent or used carbon of traditional carbon-based filters is not practically reusable (e.g. throw-away canisters). As such it is desirable to find a material reusable in filtering technologies.

SUMMARY

In an embodiment, a method of making activated carbon particles from hemp includes: placing raw hemp within a predefined atmosphere to produce activated carbon particles from the raw hemp and carbonizing the raw hemp to produce the activated carbon particles.

In another embodiment, a filter including an enclosure containing activated carbon particles produced from raw hemp, an inlet, and an outlet fluidly coupled to the inlet is disclosed. In such an embodiment, the enclosure defines a flow path from the inlet, through at least one filtering layer, and to the outlet to remove or reduce an element from a fluid flowing along the flow path. Further in such an embodiment, the at least one filtering layer includes a layer of the activated carbon particles.

In yet another embodiment, activated carbon particles are prepared by a process including: placing raw hemp within a predefined atmosphere to produce activated carbon particles from the raw hemp and carbonizing the raw hemp to produce the activated carbon particles.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 9A-9I depict graphics that illustrate the fit diagnostics for the assumptions of the model passed, normality of residuals, collinearity, and homogeneity of variance for the categorical predictor variable filter type, according to one or more embodiments shown and described herein.

DETAILED DESCRIPTION

Figure 1:
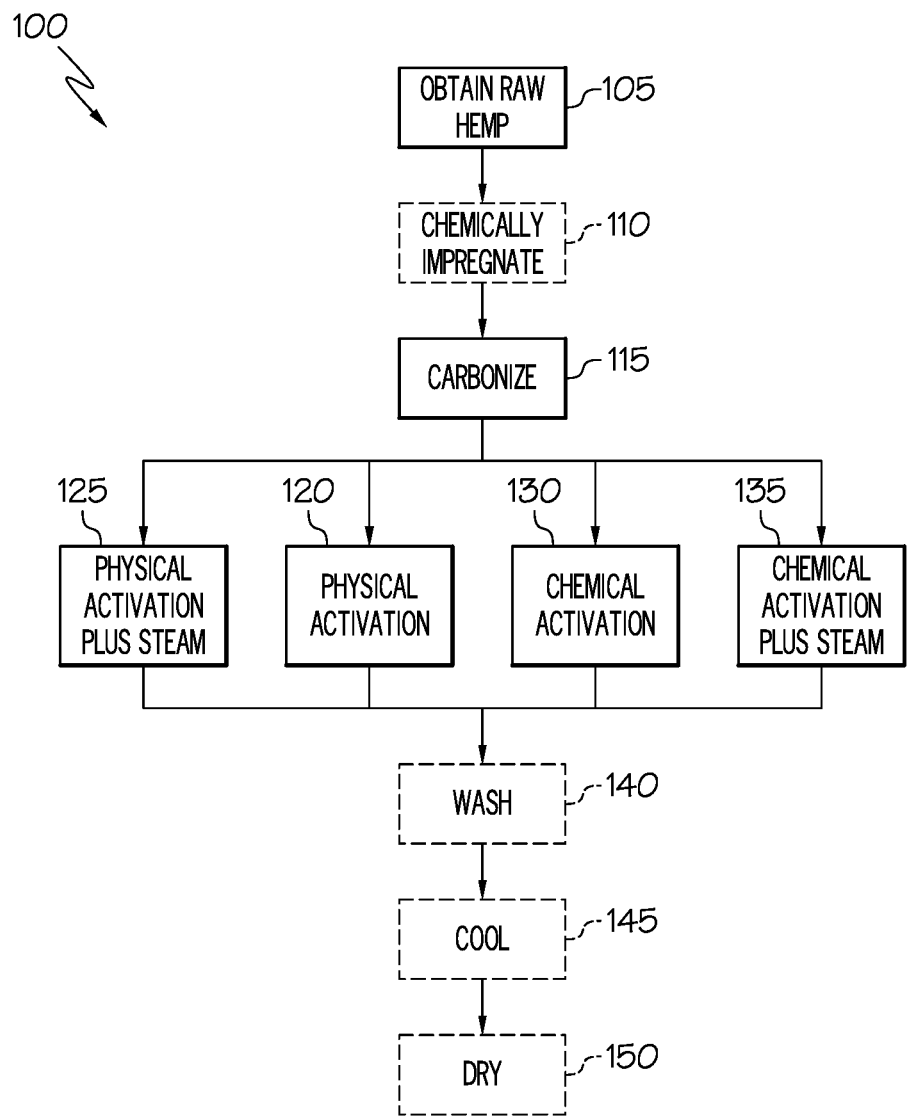
FIG. 1 depicts a flow diagram of an illustrative method of making activated hemp according to one or more embodiments shown and described herein.

Embodiments described herein are generally directed to filters, filtration devices, filtration systems, and/or the like that utilize activated hemp and/or components derived from activated hemp. According to various embodiments, activated hemp and/or products derived therefrom are used for the purposes of filtering particulates from a fluid flowed therethrough. The fluid flowed through the filters, filtration devices, and/or filtration systems of the present disclosure is not limited by this disclosure and can be any fluid that may potentially contain particulate matter, contaminants, and/or the like for which filtration is desired. Illustrative examples of fluids include water (e.g., drinking water, wastewater, etc.), fuels (e.g., gasoline, etc.), gases (e.g., air, exhaust fumes, etc.), vapors, molten materials, supercritical fluids, biologics (e.g., blood), and/or the like.

The systems, apparatuses, and methods described herein may generally be used for any filtering application, particularly filtering applications that are used for filtering fluids containing particles, contaminants, and/or the like. The filtering application may be, for example, any mechanical, physical, and/or biological operation that removes components from a fluid. According to various aspects, for example, the filtering application may be used to remove and/or reduce chemicals, biological contaminants, heavy metals, suspended solids, odors, toxicants, toxins, pharmaceutical drugs, gases, parasites, bacteria, algae, viruses, fungi, and/or the like from water (e.g., seawater, brackish water, wastewater, well-water, spring water, purified water, mineral water, sparkling water, artesian water, runoff water, surface water, storm water, and/or the like). According to other aspects, for example, the filtering application may be used to remove and/or reduce dust, pollen, volatile organic compounds, mold, bacteria, and/or the like from environmental air. Other filtering applications not specifically described herein should be readily apparent and are included within the scope of the present disclosure.

According to various embodiments, a filter, a filtration device, a filtration system, and/or the like may include materials formed from hemp (e.g., including raw hemp, treated hemp, non-activated hemp, low-activated hemp, and/or activated hemp, etc.). According to various aspects the filter, filtration device, filtration system and/or the like may include hemp in any form (e.g., nanosheet form and/or size of hemp using nanotechnology), any granular form and/or size of hemp, any pulp form and/or size of hemp, any packet form and/or size of hemp, any gas-absorbent type materials used with hemp, any soluble or insoluble component(s) used with hemp, any element(s) and/or elemental type material(s) used with hemp, any chemical elements used with hemp, any storing of any chemical compound(s) with hemp, any dehydrating agent form and/or size used with hemp, any powdered form and/or size of hemp, any pelletized form and/or size of hemp, and any cloth textile technology form and/or size of hemp. Notably, the hemp in such aspects may include raw hemp, treated hemp, non-activated hemp, low-activated hemp, and/or activated hemp.

In some embodiments, the filters, filtration devices, filtration systems, and the like, as described herein, may generally include the use of hemp in any manner that may otherwise contain carbon from another source(s) (e.g., from activated coconut husks, activated wood, and/or activated coal). In some embodiments, the filters, filtration devices, filtration systems and/or the like (e.g., as described herein, that include materials formed from raw hemp, treated hemp, non-activated hemp, low-activated hemp, and/or activated hemp hemp) may include fixed-bed ion exchange systems, continuous ion exchange separation systems, oil refinery wastewater systems, petroleum refining operations systems, municipal water treatment systems, industrial water treatment systems, environmental air treatment systems, residential point-of-use/entry treatment systems, food and ballast treatment systems, ballast water treatment systems, mercury removal systems, medical systems (e.g., pharmaceutical, wound care, and/or hemo-dialysis applications), energy storage systems (e.g., battery technologies that include hemp), agricultural chemical removal systems, disinfection by-product systems, odor control systems, metal/mineral recovery systems, emergency related systems (e.g., disaster relief systems, water delivery systems, emergency air filtration systems, spill cleanup systems, earthquake cleanup systems, and flooding cleanup systems) and/or the like.

According to embodiments described herein, hemp is a natural, renewable resource derived from hemp plants that is usable in filtering technologies as well as other applications as described herein. Notably, although both hemp and marijuana are derived from the plant species *Cannabis sativa* and contain the psychoactive component tetrahydrocannabinol (THC), hemp and marijuana are genetically distinct. More specifically, hemp is a variety of the *Cannabis sativa* plant that is cultivated specifically for agricultural and/or industrial uses [e.g. fibers, oils, feed, and/or the like] rather than pharmacological uses [e.g., THC, Cannabinoids (CBSs)]. In particular, according to various embodiments described herein, hemp may comprise a low concentration of THC (e.g., less than 1%). Hemp is fast growing and renews itself at a sufficient rate for long-term, sustainable economic use and is scalable to fulfill current and future demands. Furthermore, according to embodiments described herein, hemp provides a bio-based filtering technology that is not only effective in removing particulate matter from fluids but also safer for human health relative to chemical-based filtering technologies.

According to various aspects described herein, raw hemp may undergo an activation treatment process to obtain activated hemp. Generally, any type of activation treatment process may be utilized. According to various aspects, the activation treatment process may include a pretreatment, a preparation and/or a treatment of raw hemp (e.g., that results in non-activated hemp, low-activated hemp, and/or activated hemp). According to other aspects the activation treatment process may include a charcoal reaction process, modeling (e.g., via a fabricated assembly) an environment(s) needed to chemically activate the raw hemp, a steam activation process, and/or activation via a pyrolysis process (e.g., with indirect heat and/or direct heat [e.g., via a rotary kiln], at any stage, in any format or sequence), a torrefaction process, an ammonia fiber explosion process, and/or the like. According to further aspects, the activation treatment process may include reheating and/or reactivating hemp (e.g., in an oxidizing atmosphere, in an atmosphere containing steam, in an atmosphere containing steam and nitrogen, in any recovery reactivating processes, etc.). According to yet further aspects, the activation treatment process may include applying a compression pressure (e.g., between 0 and 100 pounds per square inch) on the physical and electrochemical properties of hemp, re-agglomeration, baking, pre-heating, screening via a material (e.g., American Society for Testing and Materials [ASTM E11-87] including sizes ranging from a No. 325 Sieve (0.045 mm) to a No. 4 Sieve (4.75 mm)), adding a binder or multiple binders (e.g., a natural binder [such as a protein], a commercial binder [such as a lignosulfonate], etc.), and adding a material (e.g., one or more different kinds of charcoal) to match certain characteristics of a desired hemp (e.g., treated hemp, non-activated hemp, low-activated hemp and/or activated hemp). According to various aspects, the activation treatment process may include adding about 1 to about 10 different types of material wherein the different types of material include amla seeds, almonds, agemtum, babool, bagasse, bamboo dust briq, bark, beehive briq, any type of biobased material, besaram, banmara, cashew shells, walnut shells, castor seed shells, any type of coal, cedar cones, coconut shells, coffee husks, coir pith, commercial briq., corn cob, corn cob waste, cotton shells, ficus, jute waste, katra ghass, labakshi, lantana, miscalthus (elephant grass), paddy straw, palm fronds, rice husk, rice char (ash), rice char, rice stem, rice busha, saw dust, soybean (any portion of biomaterial), sugarcane, tea waste, tobacco waste, thakalkanda, any type of wood, wheat stalk, and/or water hyacinth.

FIG. 1 depicts a flow diagram of an illustrative method 100 of making activated hemp according to one or more embodiments shown and described herein. According to various aspects, the method 100 described in FIG. 1, or part thereof, may further be used as a portion of a method of forming a filter, filtration device, and/or filtration system including activated hemp and/or activated hemp-derived materials. Accordingly, the method 100 described in FIG. 1 may include one or more processes that are also used for the purposes of filter, filtration device and/or filtration system creation.

For purposes of illustration, the processes of FIG. 1 specifically relate to activating hemp via a physical activation 120, a physical activation plus steam 125, a chemical activation 130, and a chemical activation plus gas 135. In some embodiments, the chemical activation 130 and/or the chemical activation plus gas 135 may be advantageous because they may require lower temperatures and/or a shorter time periods for activation.

In reference to block 105 of FIG. 1, raw hemp may be obtained. Raw hemp generally refers to untreated hemp. Notably, according to the various aspects described herein, raw hemp may include fully matured hemp and/or young germinated seedlings. Further, according to the various aspects described herein, raw hemp may include the full hemp plant and/or one or more components of a hemp plant (e.g., fibers thereof, fibers contained within the leaves, the seeds, the stems, the roots, and the connective tissue, bast fibers, outside fibers, inside fibers, the shiv/shives/hurd [e.g., inner part of hemp stem/stalk], the bast [e.g., outer part of hemp stem/stalk], the flower of hemp plant, the seeds of hemp plant, and/or the like). The amount of raw hemp obtained at block 105 is not limited by this disclosure, and may generally include any amount of hemp. According to various aspects, about three pounds of harvested raw hemp may yield about one pound of activated hemp usable to make filter components, filters, filtration devices, filtration systems, and/or other applications as described herein.

After the raw hemp is obtained at block 105, the method of FIG. 1 may optionally include (shown in phantom) chemically impregnating the raw hemp with one or more chemicals at block 110. Chemical impregnation at block 110 before carbonization at block 115 may enhance the natural properties of the raw hemp during carbonization. According to alternative aspects, however, it may be advantageous for chemical impregnation to optionally occur after carbonization at block 115 (e.g., after activation via one of blocks 120, 125, 130, or 135). In either case, if chemical impregnation occurs, the result would be chemically impregnated activated carbons, which are carbonaceous adsorbents that have chemicals finely distributed on their internal surface. According to various embodiments, chemical impregnation may optimize the existing properties of the activated carbons providing a synergism between the chemicals and the carbons. In one example, such a synergism enables the removal of certain impurities from gas streams. According to aspects described herein, chemical impregnation includes a process wherein raw hemp (e.g., if impregnation occurs prior to carbonation) or the activated carbons (e.g., if impregnation occurs after carbonation) are treated with a chemical reagent that reacts with low molecular weight or polar gases (e.g., chlorine, sulphur dioxide, formaldehyde, and ammonia), binding them up on the raw hemp or the activated carbons, respectively, and thereby removing them from an airstream. This process may be referred to as "chemisorption" and may involve neutralization or catalysis reactions. According to various aspects, the chemical impregnation process may be carefully controlled to ensure correct loading levels and even distribution of the chemical reagent on the raw hemp or the activated carbons (e.g., without restricting access to the reaction sites within the network of pores of the activated carbons). Furthermore, in various aspects, properties (e.g., activity, moisture content, particle size, etc.) may affect the performance of the adsorbent, and can be controlled to ultimately optimize filter efficiency and service life. Illustrative chemicals may include silver (including nanoscale silver particles and/or silver containing compounds) and/or chemicals containing an acid, a base, or a salt. In such an aspect the loading level of impregnated silver may be less than 2%. Illustrative examples and processes associated with silver impregnated activated carbons are described in Chen Chen, Bromide Removal from Surface Waters by Silver Impregnated Activated Carbons, pp. 1-89, the entire disclosure of which is hereby incorporated by reference herein. Further in such an aspect, illustrative acids include phosphoric acid (H3PO4), methionine, lysine, mono sodium glutamate (MSG), or the like. Yet further in such an aspect, a base generally refers to a chemical compound that can remove a proton from a molecule of an acid in an acid-base reaction. In some embodiments, a base may include a base having a conjugate acid with a pKa (e.g., strength of acid in solution) of less than about 13. Illustrative examples of a base include lithium hydroxide (LiOH), sodium hydroxide (NaOH), potassium hydroxide (KOH), rubidium hydroxide (RbOH), cesium hydroxide (CsOH), magnesium hydroxide (Mg(OH)2), calcium hydroxide (Ca(OH)2), sulfur hydroxide, strontium hydroxide (Sr(OH)2), barium hydroxide (Ba(OH)2), or the like. Further still in such an aspect, illustrative examples of a salt include calcium chloride (CaCl2) and zinc chloride (ZnCl2).

Next, the method of FIG. 1 includes carbonization at block 115. Notably, carbonization may occur through various processes including physical activation at block 120, physical activation plus steam at block 125, chemical activation at block 130 and/or chemical activation plus gas at block 135. Such processes 120, 125, 130, and/or 135 result in activated carbons usable in the various applications described herein.

Physical Activation

According to embodiments described herein, a physical activation of hemp at block 120 may include pyrolysis, a decomposition of the organic material (e.g., hemp) through the application of heat. Particularly, at block 120, the raw hemp may be placed in a non-oxidizing atmosphere (e.g., an oxygen deficient environment, environment including the absence or near absence of oxygen, etc.). According to various aspects the non-oxidizing atmosphere may be at a temperature of about 200° C. or greater. In some embodiments, the oxidizing atmosphere may be heated to a temperature of about 200° C. to about 2000° C., including about 200° C., about 300° C., about 400° C., about 500° C., about 600° C. about 700° C., about 800° C., about 900° C., about 1000° C., about 1100° C., about 1200° C., about 1300° C., about 1400° C., about 1500° C., about 2000 CC or any value or range between any two of these values (including endpoints).

According to some embodiments the non-oxidizing atmosphere may be pressurized to a pressure of about 100 atmospheres (atm). In some embodiments, the oxidizing atmosphere may be pressurized to a pressure greater than about 100 atm. In some embodiments, the oxidizing atmosphere may be pressurized to a pressure of about 100 atm to about 1500 atm, including about 100 atm, about 200 atm, about 300 atm, about 400 atm, about 500 atm, about 600 atm, about 700 atm, about 800 atm. about 900 atm, about 1000 atm, about 1100 atm, about 1200 atm, about 1300 atm, about 1400 atm, about 1500 atm, or any value or range between any two of these values (including endpoints). In various aspects such pressures may be realized in any style, shape, or confinement of holding tank or storage tank, in any orientation, above or below ground level, or in space. According to various aspects, pressurization decreases the volume between molecules thus increasing the frequency of collisions of such molecules during an activation process.

Further, according to various embodiments described herein, the raw hemp may remain in the non-oxidizing atmosphere for a predefined period of time (e.g., up to 72 hours). According to various aspects, the raw hemp may remain in the oxidizing atmosphere for about 1 hour, about 2 hours, about 3 hours, about 4 hours, about 5 hours, about 6 hours, about 12 hours, about 18 hours, about 24 hours, about 36 hours, about 48 hours, about 60 hours, about 72 hours, or any value or range between any two of these values (including endpoints).

According some embodiments, the non-oxidizing atmosphere may be present in a controlled laboratory setting or in an uncontrolled setting that is oxygen deficient.

As a result of placing the raw hemp in the non-oxidizing atmosphere, under conditions including those described above, the hemp may be charred to achieve activated carbons. Notably, this produces activated carbons with an extensive network of pores and an extremely high surface area for absorption. According to various aspects, the surface area is about 300 $m^2/g$ to about 2000 $m^2/g$. According to other aspects, the surface area is about 300 $m^2/g$ to about 3000 $m^2/g$.

Physical Activation Example

In one particular physical activation embodiment, a 55 gallon metal barrel was utilized for an 'outer drum' and a 35 gallon barrel was used as an 'inner drum'. Such an embodiment is described in Strait III, William D., Public Health Hazard—Water Quality: Can low cost hem improve water quality?, pp. 1-43, the entire disclosure of which is hereby incorporated by reference herein. Further in such an embodiment, the outer drum was then cut to create ventilation exhaust to aid in even propagation of flames and heat intensity. The lid of the outer drum was also cut to create a hole in the center of the lid equal to a diameter of a ventilation stack (e.g., acting as a chimney) for further enhancement of the fire tetrahedron. The inner drum was also cut to allow discharge of pressure from inside. Two small holes were cut at the bottom of the inner drum, because the fire would surround the inner drum and cover the bottle portion of the inner drum thus eliminating any oxygen, contaminants, or off gas product to enter inner drum. This arrangement creates an oxygen deficient state in the inner drum, while the outer drum contains the fuel load that produces pyrolysis to the hemp inside thereby simultaneously activating the hemp at the same time, through pyrolysis. Next, the inner drum was filled with natural crude hemp, the lid was placed over inner drum, and the remaining area around the inner drum was filled to the top of the outer drum with waste fuel (e.g., sticks) as the fuel load. Once the fire was lit and sustaining, pyrolysis in the oxygen deficient environment was achieved to char the hemp to realize activated carbons within 4-6 hours, including a cool down period. Notably during this process, the lid of the inner drum was never opened to avoid compromising the oxygen deficient state. Pyrolyzed hemp or successful physical activation of hemp was evident by the bristle sound when crunching the material and/or the shininess of the material. The activated carbons are ready for applications including water filtration.

Physical Activation Plus Steam

According to alternative embodiments described herein, the physical activation of hemp at block 120, as described above, may further include the application of steam at block 125. According to various aspects, high pressure steam is applied during and/or after pyrolysis to enhance the charring and the activated carbons produced. In one aspect, steam may be applied after pyrolysis in an inert environment.

Chemical Activation

According to alternative embodiments described herein, the raw hemp may be chemically activated at block 130. For chemical activation, the raw hemp may be placed in an inert atmosphere. According to various embodiments, the inert atmosphere may include an excess of potassium hydroxide (KOH) and/or sodium hydroxide (NaOH). According to other aspects, phosphoric acid ($H_3PO_4$) and/or zinc chloride ($ZnCl_2$) may be used separately and/or in combination therewith. Other chemical compounds suitable for chemical activation may also be utilized.

As a result of placing the raw hemp in the inert, chemically-rich atmosphere activated carbons are produced with an extensive network of pores and an extremely high surface area for absorption. According to various aspects, the surface area is about 300 $m^2/g$ to about 2000 $m^2/g$. According to other aspects, the surface area is about 300 $m^2/g$ to about 3000 $m^2/g$.

Chemical Activation Plus Gas

According to alternative embodiments described herein, the chemical activation of hemp at block 130, as described above, may further include the application of a gas at block 135. According to various aspects, a gas such as Nitrogen (N) and/or Argon (Ar) is applied during and/or after the chemical activation to enhance the activated carbons produced. Further, in such an aspect, hydrochloric acid (HCl) may be utilized.

According to various embodiments, regardless of the process 120, 125, 130, and/or 135 utilized, carbonization at block 115 occurs. Notably, in some alternative aspects the some carbonization processes (e.g., physical activation processes 120 and/or 125) may occur in an inert environment and some carbonization processes (e.g., chemical activation processes 130 and/or 135) may occur in an oxidizing environment.

Carbonization at block 115, via activation processes 120, 125, 130, and/or 135, generally converts the hemp to activated carbon particles/compounds that are suitable for filtering applications, and other applications, as described later herein. Carbonization of the material may include, for example, placing the material in an environment having a temperature of about 200° C. to about 2000° C., including about 200° C., about 300° C., about 400° C., about 500° C., about 600° C., about 700° C., about 800° C., about 900° C.

about 1000° C., about 1100° C., about 1200° C., ° C., a1300° C., about 1400° C., about 1500° C., about 200) ° C., or any value or range between any two of these values (including endpoints). In addition, carbonization may also include keeping the material in the environment for a predefined period of time (e.g., up to 72 hours). According to various aspects, the material may be carbonized for about 1 hour, about 2 hours, about 3 hours, about 4 hours, about 5 hours, about 6 hours, about 12 hours, about 18 hours, about 24 hours, about 36 hours, about 48 hours, about 60 hours, about 72 hours, or any value or range between any two of these values (including endpoints).

Next, according to various embodiments, at block 140, the material (e.g., activated carbon particles) may optionally be washed (shown in phantom). According to various embodiments, washing the material may include a water wash, an acid wash, and/or a carbon impregnation. According to various embodiments, ash is washed out at block 140.

Next, according to various embodiments, at block 145, the material (e.g., activated carbon particles) may optionally be cooled (shown in phantom). According to various embodiments, cooling the material may include cooling via screw feeders, live bottoms, belt conveyors, and/or shaftless screw conveyors. According to various aspects, for various activated carbons (e.g., silver impregnated actuated carbons, biocompatible polymer coated activated carbons) cooling at block 145 may give a smooth and permeable coat to the activated carbons without blocking the pores (e.g., useful for hemoperfusion).

Next, according to various embodiments, at block 150, the material (e.g., activated carbon particles) may optionally be dried (shown in phantom). According to an alternative embodiment, drying may occur before physical activation at blocks 120 or 125 or before chemical activation at blocks 130 or 135. Notably, drying may also optionally occur during reactivation as described in FIG. 2 below. Nonetheless, according to various embodiments, drying the material may include hanging (e.g., in an a tobacco shed, in an open environment warehouse, and/or in a closed environment warehouse) harvested hemp, baled harvested hemp, retted harvested hemp, for a time range of about 0-2 years, at a temperatures range of about −32° F. to about 300° F. According to various aspects, the material may be dried under inert, controlled conditions. According to other aspects, the material may be dried under outside conditions withstanding all seasons and weather elements. According to various aspects, the humidity of the hemp may range from about 0% to about 100%. According to an alternative aspect of the present disclosure, the material may be dried via a rotary kiln or the like. According to various aspects, drying at block 150 may enhance the quality of the resulting activated carbons (e.g., quality control)

After physical activation (e.g., via blocks 120 and/or 125) or chemical activation (e.g., via blocks 130 and/or 135), the activated hemp is ready for use in a number of applications, as described herein, including incorporation into filters, filtration devices and/or filtration systems.

Figure 2:
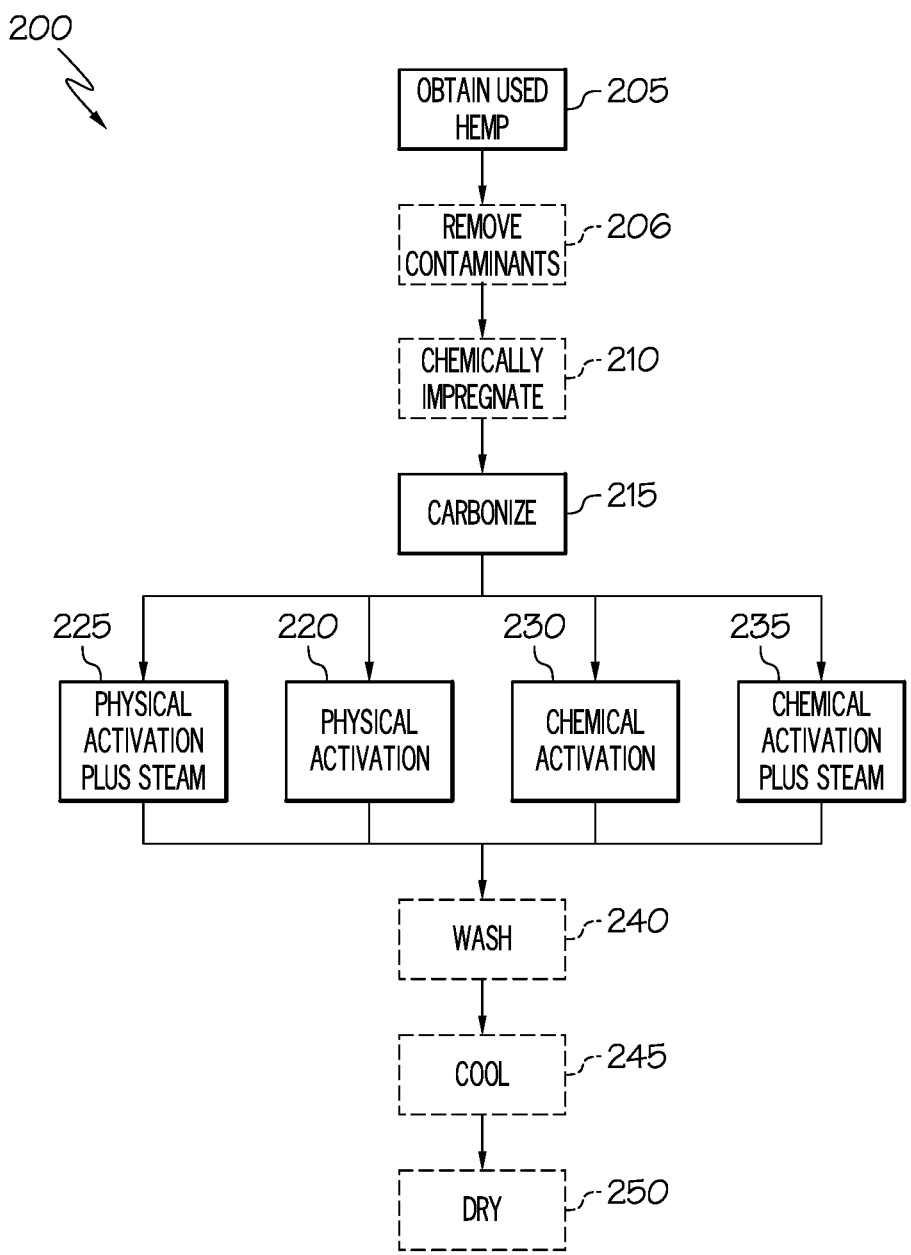
FIG. 2 depicts a flow diagram of an illustrative method of reactivating used hemp according to one or more embodiments shown and described herein.

FIG. 2 depicts a flow diagram of an illustrative method 200 of reactivating used hemp according to one or more embodiments shown and described herein. In FIG. 2, subsequent to an initial physical or chemical activation, used (e.g., post-use) hemp material may be obtained at block 205. According to various embodiments, the reactivation method 200 may optionally remove contaminants from used hemp material at block 206 (shown in phantom). This step may not be required if the contaminants would burn off naturally during the reactivation process (e.g., thermal elimination). At block 206, in one aspect, the used hemp material may be washed, which may depend on what the hemp material has been used for and whether it could be chemically activated again (e.g., which may be based on the type of contaminants located within the used hemp material). According to another aspect, at block 206, a chemical scrubber may be used. After optional removal of the contaminants at block 206, the used hemp material may be carbonized at block 215 via physical reactivation (e.g., at blocks 220 and/or 225) or chemical reactivation (e.g., at blocks 230 and/or 235) as similarly described in FIG. 1. Similarly, as described in FIG. 1, the hemp material may optionally be chemically impregnated at block 210 before or after carbonation at block 215. Further, similar to FIG. 1, the reactivation method 200 may optionally include a wash at block 240, a cooling at block 245 and/or a drying at block 250.

According to an alternative embodiment, the reactivation/regeneration process 200 may optionally include thermal reactivation (not shown). In such an aspect, the thermal reactivation process may include drying the material (e.g., at about 105° C.), then subjecting the material, under an inert atmosphere, to high temperature desorption and decomposition (e.g., at about 500° C. to about 900° C.), then subjecting the material to a residual organic gasification using a non-oxidizing gas (e.g., steam or carbon dioxide) at further elevated temperatures (e.g., at about 1500° C.). Such a reactivation process enables used (e.g., spent) hemp material to be recycled for reuse. Reintroducing reactivated hemp into filters, filtration devices, and/or filtration systems further buttresses the sustainable use of hemp in filtration technologies (e.g., a zero waste capacity product).

Forms of Activated Hemp for Use within Filters, Filtration Devices and Filtration Systems Activated hemp (e.g., resulting from the processes described in FIG. 1) includes activated carbon (R-1) particles usable in filters, filtration devices and filtration systems. According to various embodiments, activated carbon particles derived from activated hemp for use in filtering technologies may take many forms including powdered activated carbon (PAC), granular activated carbon (GAC), extruded activated carbon (EAC) bead activated carbon (BAC), impregnated carbon (IC), and/or polymer coated carbon (PCC). Powdered activated carbon (PAC) may require careful handling to maintain a clean workplace due to the dusty nature thereof. In such an aspect, dispersible pellets (DP) or dispersible briskets (DB) may be used to address this issue.

According to various embodiments, activated carbon (R-1) particles may be defined as the activated carbon particles retained on a U.S. Standard Mesh Size No. 50 sieve including 0.297 mm openings (e.g., activated carbon particle sizes greater than 0.297 mm).

According to other embodiments, activated carbon (R-1) may be made in particulate form as powders or fine granules that are less than about 1.0 mm in size with an average diameter of about 0.15 mm to about 0.25 mm. As such, the activated carbon presents a large surface to volume ratio with a small diffusion distance.

Powder Activated Carbon (PAC) particles are finer than activated carbon (R-1) particles. PAC particles are made up of crushed/ground activated carbon particles. According to various aspects, PAC particles may be defined as the activated carbon particles passing through a U.S. Standard Mesh Size No. 80 sieve including 0.177 mm openings (e.g., activated carbon particle sizes smaller than 0.177 mm).

According to various aspects, PAC particles may be added to process units (e.g., raw water intakes, rapid mix basins, gravity filters, etc.)

Granular Activated Carbon (GAC) particles may have a larger particle size relative to powdered activated carbon (PAC) particles. GAC particles may be either in granular form or in extruded form. According to various aspects, GAC particles are suitable for absorption of gases and vapors because they diffuse rapidly. In this vein, according to various aspects, GAC particles may be defined by sizes (e.g., 8×20, 20×40, or 8×30 for liquid phase applications, 4×6, 4×8, or 4×10 for vapor phase applications, etc.). According to such aspects, a 20×40 GAC particle, for example, may be defined as the activated carbon particles that pass through a U.S. Standard Mesh Size No. 20 sieve including 0.841 mm openings (e.g., activated carbon particle sizes smaller than 0.841 mm) but that are retained on a U.S. Standard Mesh Size No. 40 sieve including 0.420 mm openings (e.g., activated carbon particle sizes larger than 0.420 mm). According to various aspects the minimum GAC particle size may be defined as the activated carbon particles retained on a U.S. Standard Mesh Size No. 50 sieve including 0.297 mm openings (e.g., activated carbon particle sizes greater than 0.297 mm). According to various aspects, GAC particles may be used for water treatment, deodorization, flow system component separation and/or rapid mix basin applications.

Extruded Activated Carbon (EAC) particles combine PAC particles with a binder, which are fused together and extruded into a cylindrical-shaped activated carbon block with a diameter from about 0.8 mm to about 130 mm. According to various aspects, EAC particles may be used in chlorine, taste, odor (CTO) filter applications and/or gas phase applications (e.g., due to their low pressure drop, high mechanical strength, and low dust content).

According to various aspects, EAC particles may be formed via a densification system (e.g., a screw extruder, a cuber, and/or the like). According to one aspect, the pressures in a cuber may range from about 24 MPa to about 34 MPa. In such an aspect, the natural binders in chopped biomass, the high pressure of a press wheel, and heat generated by forcing biomass through dies help bond the cubes. Further in such an aspect, an adjustable deflector around the outside of a die ring may break the cubes in lengths of about 50 mm to about 75 mm. According to another aspect, a pellet mill may be utilized to form pellets with a uniform size (e.g., length of about 13 mm to about 19 mm and diameter of about 6.3 mm to about 6.4 mm), shape (e.g., cylindrical), and unit density (e.g., about 1125 kg/m$^3$ to about 1190 kg/m$^3$). According to yet another aspect, a briquette press (e.g., hydraulic press, mechanical press, roller press, etc.) may be utilized to form briquettes. In such an aspect, briquettes produced using a hydraulic press have uniform shape (e.g., cylinders), size (about 40 mm×40 mm), and unit density (e.g., about 800 kg/m$^3$ to about 1000 kg/m$^3$). Further in such an aspect, a roller press, tablet press or tabletizer may be utilized to press (e.g., via a hydraulic motor and ram) biomass into cylindrical mold (e.g. about 4-6 in in diameter) at about 20 ksi. In such an aspect, the biomass is reduced from about 10 in to about 2 in and the pressure may be sufficient to cause the PAC particles to adhere together without adding a binder and/or an agglomerator. According to various aspects, catalysts (e.g., potassium hydroxide) may be mixed with the PAC particles prior to extrusion to obtain a specific pore structure.

Bead Activated Carbon (BAC) particles may be defined as activated carbon particles sized in diameters from about 0.35 mm to about 0.80 mm with a spherical shape. BAC may be used in gas phase applications (e.g., due to its low pressure drop, high mechanical strength, and low dust content) and fluidized bed applications (e.g., water filtration).

Impregnated Carbon (IC) particles include activated carbon particles containing one or more than one inorganic impregnate (e.g., iodine, silver, cations [e.g., such Al, Mn, Zn, Fe, Li, Ca]). According to such aspects, IC particles including cations may be used in air pollution control applications. According to other aspects IC particles including silver may be used in the purification of domestic water (e.g., due to antimicrobial and antiseptic properties). In one example, IC particles including aluminum hydroxide (e.g., $Al(OH)_3$, a flocculating agent) may be used to obtain drinking water from natural water. According to other aspects, IC particles may be used to absorb hydrogen sulfide ($H_2S$).

Polymer Coated Carbon (PCC) particles include activated carbon particles coated with a biocompatible polymer. According to various aspects, PCC particles may be used for hemoperfusion applications (e.g., blood passed over PCC particles to remove toxic substances from the blood).

Filters, Filtration Devices and Filtration Systems Including Activated Hemp

Figure 3:
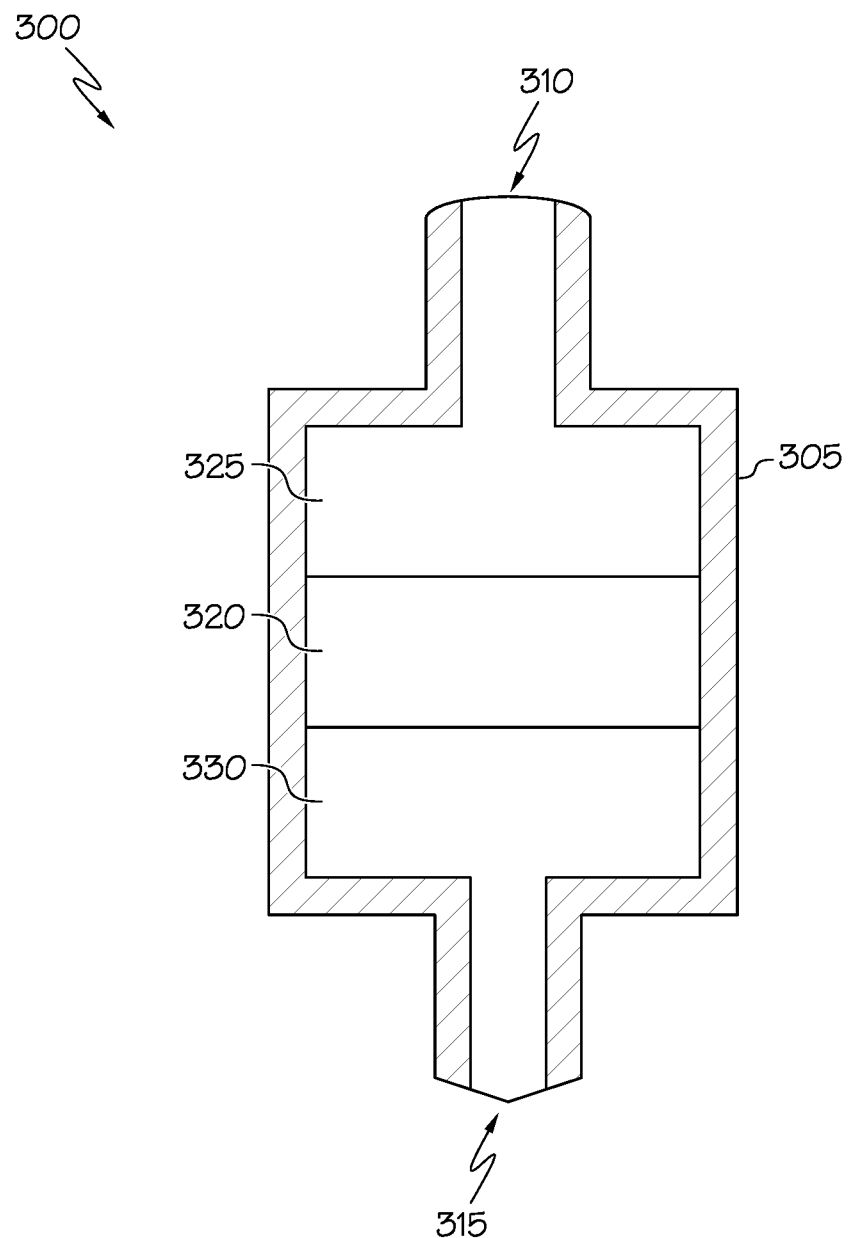
FIG. 3 depicts and illustrative filter including activated hemp according to one or more embodiments shown and described herein.

FIG. 3 depicts and illustrative filter including activated hemp according to one or more embodiments shown and described herein. According to various aspects, one or more than one form of activated hemp particles described herein (e.g., PAC, GAC, EAC, BAC, IC, PCC, etc.) may be located within filter, a filtration device and/or a filtration system. In view of FIG. 3, according to various aspects, a filter 300 may include an enclosure 305, an inlet 310, and an outlet 315 fluidly coupled to the inlet 310. In such aspect, the inlet 310 and the outlet 315 of the filter 300 may be configured such that a fluid (e.g., liquid, gas, etc.) including an undesired characteristic/element (e.g., contaminant, odor, etc.) is flowable into the inlet 310 and flowable out of the outlet 315. According to various aspects, the enclosure 305 of the filter 300 is configured to contain at least one form of activated hemp particles 320 (e.g., as described herein) to remove and/or reduce an undesired characteristic/element associated with the fluid. According to some aspects, the enclosure 305 of the filter 300 may further include other materials (e.g., fibrous materials, screens, sand, pea gravel, etc.) and/or multiple layers and/or stages of such other materials (e.g., ref. 325 and/or 330) to aid in removing and/or reducing the undesired characteristic/element associated with the fluid. According to various aspects, one or more than one form of activated hemp particles may be integrated within another material (e.g., a fibrous material, a screen, etc.) Further according to various aspects, the enclosure 305 may be configured to define a flow path for the fluid to follow between the inlet 310 and the outlet 315. According to such aspects, the flow path may direct the fluid through the multiple layers and/or stages to reduce the undesired characteristic/element in and/or remove the undesired characteristic/element from the fluid before it exits the outlet 315 of the filter 300.

According to further aspects, one or more than one form of activated hemp particles described herein (e.g., PAC, GAC, EAC, BAC. IC, PCC, etc.) may be located within any conventional filter, a filtration device and/or a filtration system. For example, the one or more forms of activated hemp particles may be utilized as the filtering media in existing downflow and/or upflow filters with backwash control. As another example, one or more forms of activated hemp particles may be utilized as the filtering media in existing home filtration systems (e.g., AQUASANA® filtering systems, etc.).

Analysis of a Raw Hemp Sample

Figure 4:
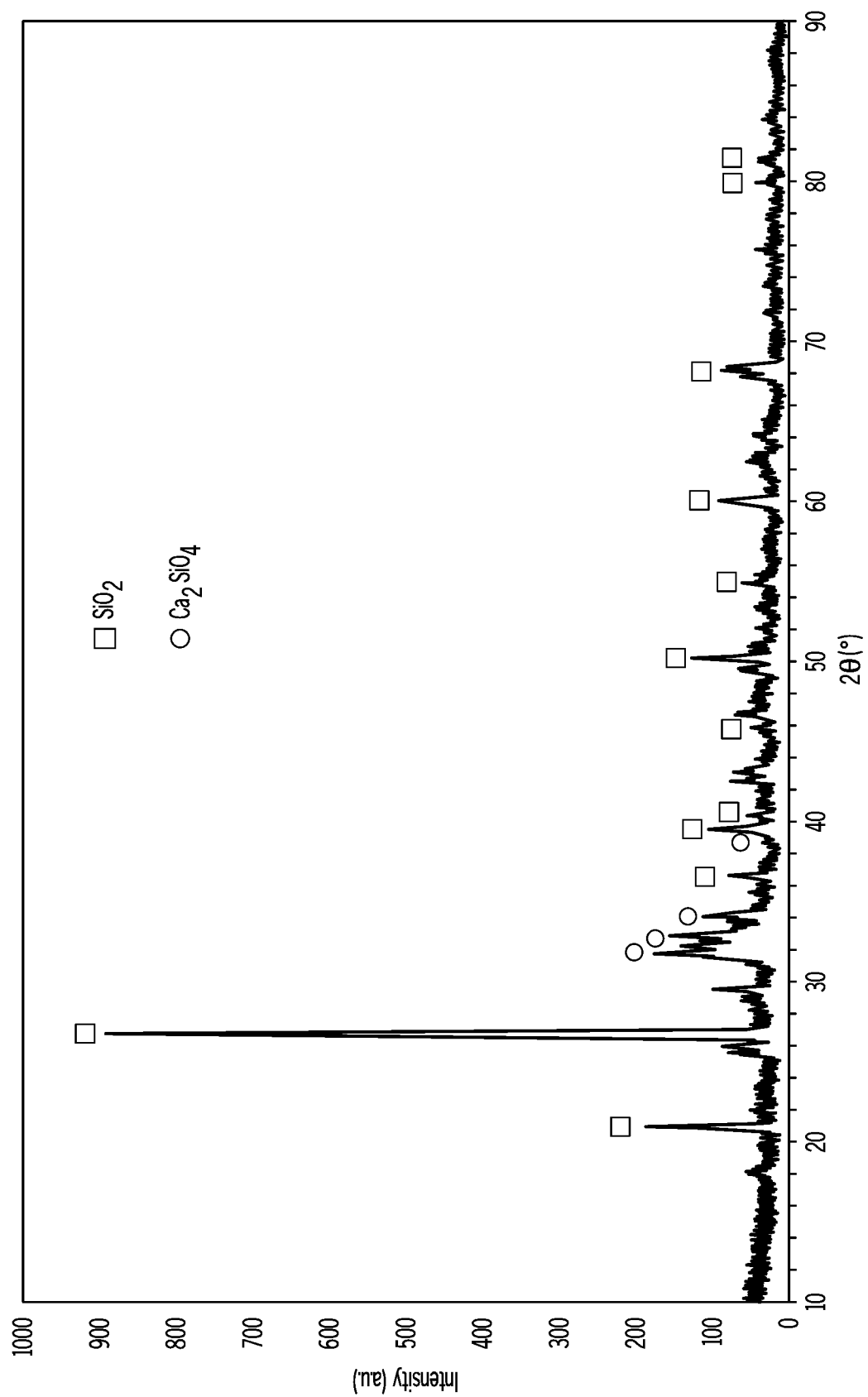
FIG. 4 depicts a graphic that illustrates the results of an x-ray diffraction analysis of a raw hemp sample according to one or more embodiments shown and described herein.

Next, FIG. 4 depicts a graphic (e.g., diffractogram) that illustrates the results of an x-ray diffraction (XRD) analysis of a raw hemp sample (e.g., Sample H1). XRD was used to determine the crystallinity of the hemp compounds. More specifically XRD was used to identify polymorphic forms (e.g., more than one form of crystal structure) within the sample of raw hemp. In this vein, referring to FIG. 4, the polymorphic forms identified include silicon dioxide (e.g., $SiO_2$, silicate) and calcium silicate ($Ca_2Si_4$). In view of FIG. 4, the main phase in Sample H1 is $SiO_2$. Notably, no obvious carbon peaks were detected in Sample H1. Here, in light of its silicate and calcium silicate the raw hemp may be incorporated or usable in construction applications. In particular, the raw hemp may be used as a component of cement or cement aggregate.

Notably, according to various embodiments, activated hemp may exhibit an electrical charge (e.g., positive charge). Conventional filtering materials (e.g., coal) do not exhibit this characteristic. In this vein, if the activated hemp is incorporated or used in cement, the electrical charge may be utilized for security purposes or applications. In one aspect, the activated hemp could act like a sensor. More specifically, the electrical charge associated with a body of cement or an environment (e.g. room) including the body of cement may be monitored. Any change in the monitored electrical charge could indicate the presence of a foreign object/person. In such an aspect, a monitoring system, in response to a detected change in electrical charge could trigger an alert in a connected security system. According to a further aspect, the activated hemp could be pressure sensitive. In one aspect, activated hemp could be utilized in a pressure mat wherein a charge from point A to point B to point C, etc. is measured as constant. When an intruder enters and interrupts the charge from, e.g., point A to point C, a sensor monitoring for a change in charge between point A and point C would trigger an alert. According to other aspects, if the activated hemp is incorporated into filters, filtration devices, and/or filtration systems, the electrical charge may be key to attracting undesired characteristics/elements (e.g., contaminants, odors) associated with the opposite charge. In one particular aspect, a positive charge of activated hemp may be utilized to filter copper out of fuel. In other aspects, due to its electrical charge, activated hemp may be utilized in batteries. More specifically activated hemp naturally functions in a way similar to an air ionizer. Such a characteristic may be advantageous in low and/or no gravity environments (e.g., filters, filtration devices, and/or filtration systems utilized in space, etc.).

Figure 5:
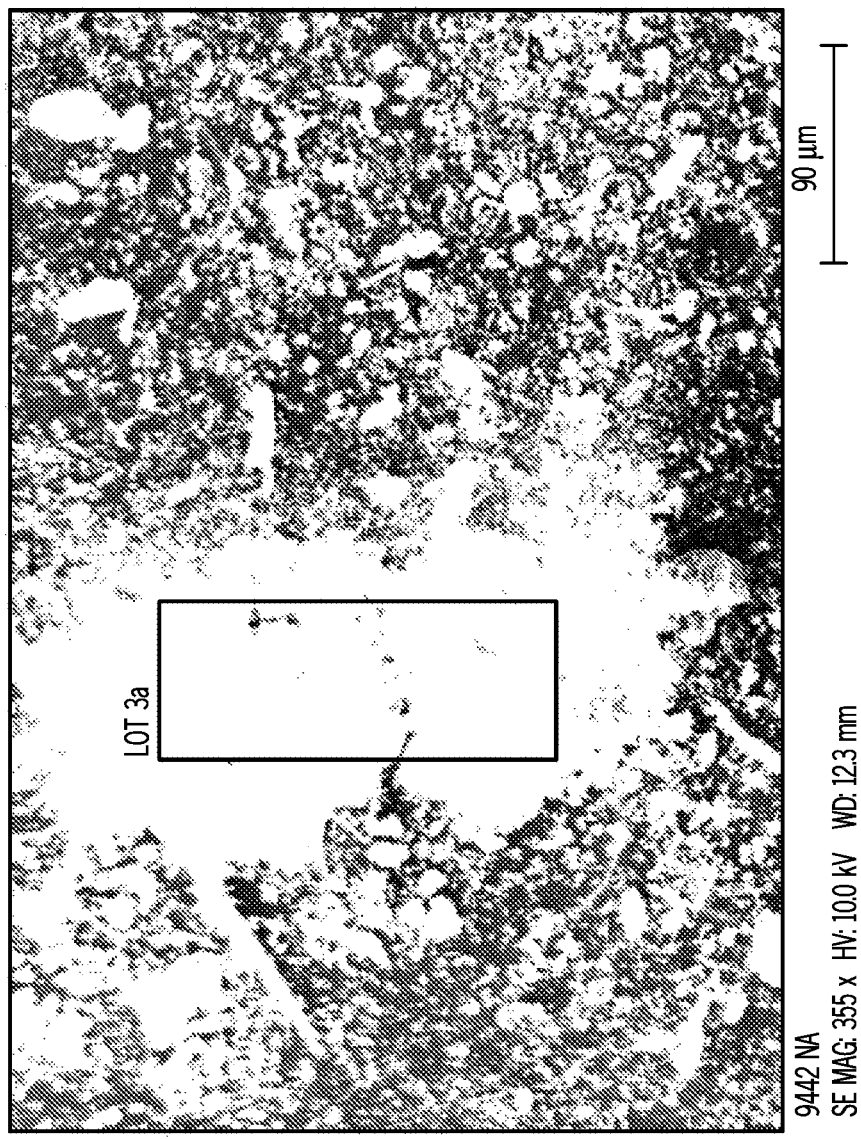
FIG. 5 depicts a micrograph of the raw hemp sample of FIG. 4 according to one or more embodiments shown and described herein.

Next, FIG. 5 depicts a micrograph of the raw hemp sample (e.g., Sample H1) of FIG. 4. Notably, the micrograph of FIG. 5 was created using a scanning electron microscope (SEM). In such an aspect, powder samples of the raw hemp were secured on a carbon adhesive and conductive tape. The powder samples were then coated with an extremely thin gold layer prior to transfer into the SEM.

Figure 6:
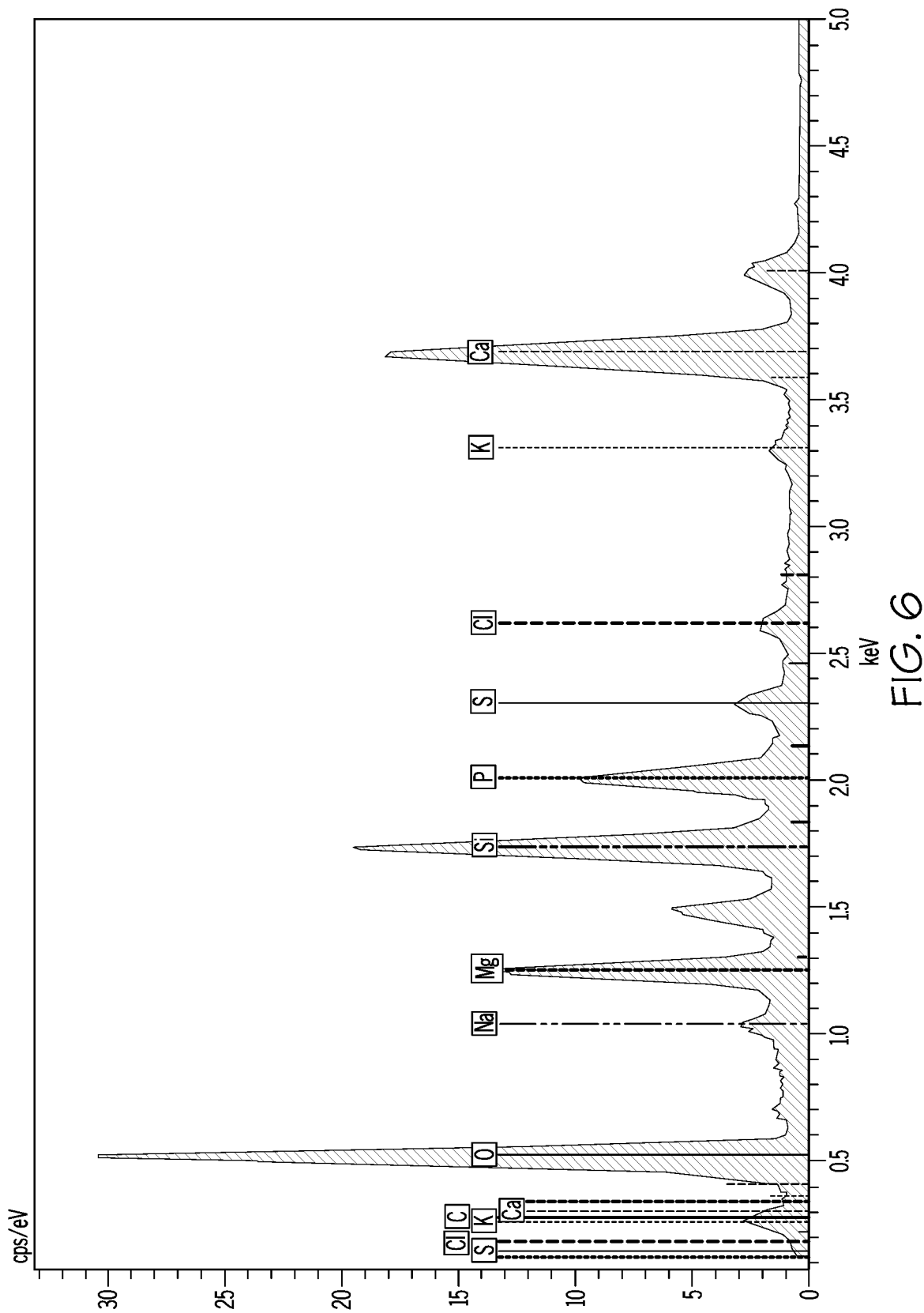
FIG. 6 depicts a graphic that illustrates the results of an energy-dispersive x-ray spectroscopy analysis of the raw hemp sample of FIG. 5 according to one or more embodiments shown and described herein.

Next. FIG. 6 depicts a graphic that illustrates the results of an energy-dispersive x-ray spectroscopy (EDS) analysis of the raw hemp sample of FIG. 5. EDS is a technique used for elemental analysis and/or chemical characterization of a sample. FIG. 6 illustrates the EDS spectrum at a first location (e.g., spot 1) within "LOT 3a" outlined in FIG. 5. Tables 1-3 below detail the chemical composition at the first location, a second location (e.g., spot 2) and a third location (e.g., spot 3), each within "LOT 3a" as outlined in FIG. 5.

TABLE 1

Chemical Composition at Spot 1 within LOT 3a

| Element | Series | unn. C [wt. %] | norm. C [wt. %] | Atom. C [at. %] | Error (1 Sigma) [wt. %] |
|---|---|---|---|---|---|
| Oxygen | K-series | 30.91 | 41.00 | 59.79 | 3.75 |
| Sodium | K-series | 0.31 | 0.41 | 0.42 | 0.05 |
| Magnesium | K-series | 3.62 | 4.81 | 4.62 | 0.21 |
| Silicon | K-series | 8.02 | 10.64 | 8.84 | 0.36 |
| Phosphorus | K-series | 3.73 | 4.95 | 3.73 | 0.17 |
| Sulfur | K-series | 0.84 | 1.11 | 0.81 | 0.06 |
| Chlorine | K-series | 0.58 | 0.77 | 0.51 | 0.05 |
| Potassium | K-series | 1.11 | 1.48 | 0.88 | 0.07 |
| Calcium | K-series | 26.19 | 34.74 | 20.23 | 0.91 |
| Carbon | K-series | 0.07 | 0.09 | 0.18 | 0.15 |
| Total: | | 75.39 | 100.00 | 100.00 | |

TABLE 2

Chemical Composition at Spot 2 within LOT 3a.

| Element | Series | unn. C [wt. %] | norm. C [wt. %] | Atom. C [at. %] | Error (1 Sigma) [wt. %] |
|---|---|---|---|---|---|
| Carbon | K-series | 0.13 | 0.16 | 0.31 | 0.25 |
| Oxygen | K-series | 34.98 | 44.45 | 63.08 | 4.20 |
| Sodium | K-series | 0.34 | 0.43 | 0.42 | 0.05 |
| Magnesium | K-series | 4.02 | 5.11 | 4.77 | 0.23 |
| Silicon | K-series | 7.45 | 9.47 | 7.65 | 0.33 |
| Phosphorus | K-series | 3.54 | 4.50 | 3.30 | 0.16 |
| Sulfur | K-series | 0.36 | 0.46 | 0.33 | 0.04 |
| Chlorine | K-series | 0.66 | 0.84 | 0.54 | 0.05 |
| Calcium | K-series | 26.47 | 33.63 | 1.9.05 | 0.92 |
| Potassium | K-series | 0.76 | 0.97 | 0.56 | 0.06 |
| Total: | | 78.71 | 100.00 | 100.00 | |

TABLE 3

Chemical Composition at Spot 3 within LOT 3a

| Element | Series | unn. C [wt. %] | norm. C [wt. %] | Atom. C [at. %] | Error (1 Sigma) [wt. %] |
|---|---|---|---|---|---|
| Carbon | K-series | 0.00 | 0.00 | 0.00 | 0.00 |
| Oxygen | K-series | 33.73 | 44.37 | 63.37 | 4.10 |
| Sodium | K-series | 0.32 | 0.42 | 0.41 | 0.05 |
| Magnesium | K-series | 3.56 | 4.69 | 4.41 | 0.21 |
| Silicon | K-series | 6.64 | 8.73 | 7.10 | 0.30 |
| Phosphorus | K-series | 3.21 | 4.22 | 3.12 | 0.15 |
| Sulfur | K-series | 0.54 | 0.71 | 0.51 | 0.05 |
| Chlorine | K-series | 0.54 | 0.71 | 0.46 | 0.05 |
| Calcium | K-series | 26.67 | 35.09 | 20.00 | 0.92 |
| Potassium | K-series | 0.81 | 1.07 | 0.62 | 0.06 |
| Total: | | 76.02 | 100.00 | 100.00 | |

In view of Tables 1-3 above, the chemical composition of the activated hemp includes mainly calcium (Ca), oxygen (O), silicon (Si), magnesium (Mg) and phosphorous (P). Notably, only trace amounts of carbon were detected. As such, the use of raw hemp, according to various aspects described herein, may lessen potential detrimental effects to human health.

Testing Example: Activated Anthracite Coal Filter Versus Activated Coconut Husk Filter Versus Activated Hemp Filter Example 1: Small Scale Filtering Apparatus A $\frac{1}{10}^{th}$ scale model was constructed of a 10 ft.×10 ft.×10 ft. filtering room at Richmond Water Treatment Plant in Waco, Ky. The model is 1 ft.×1 ft.×1 ft. (e.g., $\frac{1}{10}^{th}$ scale). Since each layer of sand, pea gravel, and anthracite coal, hemp, or coconut husk charcoal, is typically about 2 feet thick in a real life applications, the $\frac{1}{10}^{th}$ scale requires each layer to be about 2.4 inches thick. Accordingly, three (3) scale models with identical scale model layer thicknesses were constructed. In particular, one scale model including a sand layer, an activated hemp layer, and a pea gravel layer, one scale model including a sand layer, an activated coconut husk charcoal layer and a pea gravel layer (e.g., BRITA® media based model), and one scale model including a sand layer, an activated anthracite coal layer, and a pea gravel layer (e.g., Richmond Water Treatment Plant media based model).

The weight of each material was as follows:

Weight of 80 milliliters of Activated Anthracite Coal=68.889 grams

Weight of 80 milliliters of Activated Coconut Husk Charcoal=42.891 grams

Weight of 80 milliliters of Activated Hemp=13.706 grams

Weight of 80 milliliters of Sand=137.28 grams

Weight of 80 milliliters of Pea Gravel=120.173 grams

Total Volume of each layer was as follows:

3,000 mL of Sand 4,500 mL of Activated Anthracite Coal, Activated Coconut Husk Charcoal, or Activated Hemp 5,600 mL of Pea Gravel Example 2: Testing and Filtering Performance Data IDEXX.COM products were used for the following tests, including a Colilert/Q TRAY2K (e.g., standardized EPA approved E. coli measuring method), a pH monitor, a conductivity monitor, and a turbidity monitor. The testing was conducted on the scale representations described in Example 1 above. Such tests represent United States Environmental Protection Agency-approved 24 hour tests for drinking and source waters, which test for true fecal contamination. All samples were from source waters such as, for example, local rivers, storm run-off, lakes, or streams within Madison County, Ky. Tables 4-8 provide evidence of the efficacy of hemp based filters:

TABLE 4

|  | run | media | lg w1 | sm w1 | mpn total 1 | lg w2 | sm w2 | mpn total 2 | pH1 | cond1 | turb1 | pH2 | cond2 | turb2 |
|---|---|---|---|---|---|---|---|---|---|---|---|---|---|---|
| PRE | 1 | 1 | 49 | 48 | 2419.6 | 44 | 9 | 122.3 | 7.7 | 170 | 12.38 |  |  |  |
| COAL | 1 | 2 | 49 | 48 | 2419.6 | 49 | 47 | 2419.6 | 7.7 | 170 | 12.38 | 7.6 | 210 | 14.74 |
| COCO | 1 | 3 | 49 | 48 | 2419.6 | 49 | 31 | 648.8 | 7.7 | 170 | 12.38 | 8.3 | 290 | 10.11 |
| HEMP | 1 | 4 | 49 | 40 | 1119.6 | 37 | 4 | 71.2 | 7.7 | 170 | 12.38 | 8.4 | 320 | 3.3 |
| PRE | 2 | 1 | 49 | 48 | 2419.6 | 46 | 18 | 190.4 | 7.6 | 240 | 19.72 |  |  |  |
| COAL | 2 | 2 | 49 | 48 | 2419.6 | 45 | 18 | 172.6 | 7.6 | 240 | 19.72 | 7.8 | 320 | 12.78 |
| COCO | 2 | 3 | 49 | 48 | 2419.6 | 47 | 7 | 145 | 7.6 | 240 | 19.72 | 8.7 | 410 | 8.51 |
| HEMP | 2 | 4 | 49 | 34 | 770.1 | 25 | 4 | 39.3 | 7.6 | 240 | 19.72 | 8.3 | 460 | 2.81 |
| PRE | 3 | 1 | 49 | 48 | 2419.6 | 49 | 47 | 2419.6 | 8.1 | 630 | 2.39 |  |  |  |
| COAL | 3 | 2 | 49 | 48 | 2419.6 | 49 | 41 | 1203.3 | 8.1 | 630 | 2.39 | 7.6 | 470 | 13.21 |
| COCO | 3 | 3 | 49 | 48 | 2419.6 | 49 | 39 | 1046.2 | 8.1 | 630 | 2.39 | 8.5 | 680 | 3.83 |
| HEMP | 3 | 4 | 49 | 48 | 2419.3 | 49 | 25 | 461.1 | 8.1 | 630 | 2.39 | 8.4 | 500 | 2.8 |
| PRE | 4 | 1 | 49 | 48 | 2419.6 | 47 | 21 | 240 | 7.7 | 170 | 10.03 |  |  |  |
| COAL | 4 | 2 | 49 | 48 | 2419.6 | 41 | 9 | 101.4 | 7.7 | 170 | 10.03 | 7.6 | 210 | 14.74 |
| COCO | 4 | 3 | 49 | 48 | 2419.6 | 32 | 20 | 85.4 | 7.7 | 170 | 10.03 | 8.3 | 290 | 10.11 |
| HEMP | 4 | 4 | 49 | 36 | 866.4 | 19 | 2 | 24.6 | 7.7 | 170 | 10.03 | 8.4 | 320 | 3.3 |
| PRE | 5 | 1 | 49 | 48 | 2419.6 | 22 | 8 | 39.1 | 8.3 | 390 | 2.47 |  |  |  |
| COAL | 5 | 2 | 49 | 48 | 2419.6 | 49 | 26 | 488.4 | 8.3 | 390 | 2.47 | 7.9 | 430 | 7.32 |
| COCO | 5 | 3 | 49 | 48 | 2419.6 | 49 | 48 | 2419.6 | 8.3 | 390 | 2.47 | 8.7 | 640 | 3.39 |
| HEMP | 5 | 4 | 49 | 41 | 1203.3 | 36 | 11 | 82.3 | 8.3 | 390 | 2.47 | 8.3 | 580 | 1.77 |
| PRE | 6 | 1 | 49 | 48 | 2429.6 | 4 | 0 | 4.1 | 7.5 | 300 | 2.81 |  |  |  |
| COAL | 6 | 2 | 49 | 48 | 2429.6 | 49 | 25 | 461.1 | 7.5 | 300 | 2.81 | 7.6 | 380 | 17.82 |
| COCO | 6 | 3 | 49 | 48 | 1732.9 | 49 | 26 | 488.4 | 7.5 | 300 | 2.81 | 8.6 | 1100 | 6.73 |
| HEMP | 6 | 4 | 49 | 30 | 613.1 | 7 | 0 | 7.5 | 7.5 | 300 | 2.81 | 8.7 | 540 | 1.11 |
| PRE | 7 | 1 | 49 | 48 | 2419.6 | 49 | 47 | 2419.6 | 8.4 | 180 | 10.11 |  |  |  |
| COAL | 7 | 2 | 49 | 48 | 2419.6 | 49 | 70 | 1119.6 | 8.4 | 180 | 10.11 | 7.2 | 350 | 50 |
| COCO | 7 | 3 | 49 | 48 | 2419.6 | 49 | 36 | 866.6 | 8.4 | 180 | 10.11 | 8.7 | 2160 | 17.04 |
| HEMP | 7 | 4 | 49 | 36 | 866.4 | 45 | 10 | 135.4 | 8.4 | 180 | 10.11 | 8.2 | 580 | 16.62 |

Statistical Methods:

SAS 9.3 (Statistical Analysis System), a software program that is used to perform statistical data analysis was used to organize the data collected, and analyze it. Descriptive analysis as well as t-tests, and a multi-variable linear analysis of covariance (ANACOVA) regression were performed. The ANACOVA was performed first on the saturated model to explain the relationship between $\log_{10}$(E. Coli count) and filter type, as well as, other independent variables that include pre-filtration pH, pre-filtration conductivity, pre filtration turbidity as co-variants/cofounders. Backward elimination was performed on each model starting with the saturated model below using an a priori alpha level of 0.05. The final model was tested for collinearity among the variables. The presence of collinearity can be detected by statistical testing such as the measurement of the variance inflation factor (VIF), the measurement of tolerance, the condition index (CI) and the condition number (CN). In addition, tests for normality of residuals, influential outliers, a power estimate, and a test for homogeneity of variance was performed for all models analyzed.

Saturated Model:

$$\log_{10}(E.\ Coli\ \text{count}) = \beta_0 + \beta_1(\text{Filter type}) + \beta_2(\text{Pre-filtration pH}) + \beta_3(\text{Pre-filtration conductivity}) + \beta_4(\text{Pre filtration turbidity}) + E$$

Filter type=Baseline is pre-filtration level of $\log_{10}(E.\ Coli)$. This level of $\log_{10}(E.\ Coli)$ is compared separately with levels of $\log_{10}(E.\ Coli)$ for Activated Anthracite Coal filtration, Activated Coconut Husk Charcoal filtration, and Activated Hemp filtration.
Pre-filtration pH=pH of water sample before filtration.
Pre-filtration conductivity=Conductivity of water sample before filtration.
Pre filtration turbidity=Turbidity of water sample before filtration.
E=Represents error term, also known as unexplained variance, or the residuals in the model
Final Model:

$$\log_{10}(E.\ Coli\ \text{count}) = \beta_0 + \beta_1(\text{Filter type}) + \beta_2(\text{Pre-filtration pH}) + E$$

Filter type=Baseline is pre-filtration level of $\log_{10}(E.\ Coli)$. This level of $\log_{10}(E\ Coli)$ is compared separately with levels of $\log_{10}(E.\ Coli)$ for Activated Anthracite Coal filtration, Activated Coconut Husk Charcoal filtration, and Activated Hemp filtration.
Pre-filtration pH=pH of water sample before filtration.
E=Represents error term, also known as unexplained variance, or the residuals in the model
Results:

TABLE 5

The Means Procedure
Filter Type: Pre-Filtration

| Variable | N | Mean | Std Dev | Minimum | Maximum |
|---|---|---|---|---|---|
| LOG$_{10}$(EC Count) | 7 | 2.25 | 0.98 | 0.61 | 3.38 |
| Pre pH | 7 | 7.90 | 0.36 | 7.50 | 8.40 |
| Pre Conductivity | 7 | 297.14 | 167.70 | 170.00 | 630.00 |
| Pre Turbidity | 7 | 8.56 | 6.48 | 2.39 | 19.72 |

TABLE 6

The Means Procedure
Filter Type: Anthracite Coal

| Variable | N | Mean | Std Dev | Minimum | Maximum |
|---|---|---|---|---|---|
| LOG$_{10}$(EC Count) | 7 | 2.73 | 0.49 | 2.01 | 3.38 |
| Pre pH | 7 | 7.90 | 0.36 | 7.50 | 8.40 |
| Post pH | 7 | 7.61 | 0.22 | 7.20 | 7.90 |
| Pre Conductivity | 7 | 297.14 | 167.70 | 170.00 | 630.00 |
| Post Conductivity | 7 | 338.57 | 100.74 | 210.00 | 470.00 |
| Pre Turbidity | 7 | 8.56 | 6.48 | 2.39 | 19.72 |
| Post Turbidity | 7 | 18.66 | 14.18 | 7.32 | 50.00 |

TABLE 7

The Means Procedure
Filter Type: Coconut Husk Charcoal

| Variable | N | Mean | Std Dev | Minimum | Maximum |
|---|---|---|---|---|---|
| LOG$_{10}$(EC Count) | 7 | 2.70 | 0.50 | 1.93 | 3.38 |
| Pre pH | 7 | 7.90 | 0.36 | 7.50 | 8.40 |
| Post pH | 7 | 8.54 | 0.18 | 8.30 | 8.70 |
| Pre Conductivity | 7 | 297.14 | 167.70 | 170.00 | 630.00 |
| Post Conductivity | 7 | 795.71 | 664.80 | 290.00 | 2160.00 |

TABLE 7-continued

The Means Procedure
Filter Type: Coconut Husk Charcoal

| Variable | N | Mean | Std Dev | Minimum | Maximum |
|---|---|---|---|---|---|
| Pre Turbidity | 7 | 8.56 | 6.48 | 2.39 | 19.72 |
| Post Turbidity | 7 | 8.53 | 4.64 | 3.39 | 17.04 |

TABLE 8

The Means Procedure
Filter Type: Hemp Filter

| Variable | N | Mean | Std Dev | Minimum | Maximum |
|---|---|---|---|---|---|
| LOG$_{10}$(EC Count) | 7 | 1.77 | 0.57 | 0.88 | 2.66 |
| Pre pH | 7 | 7.90 | 0.36 | 7.50 | 8.40 |
| Post pH | 7 | 8.39 | 0.16 | 8.20 | 8.70 |
| Pre Conductivity | 7 | 297.14 | 167.70 | 170.00 | 630.00 |
| Post Conductivity | 7 | 471.43 | 111.87 | 320.00 | 580.00 |
| Pre Turbidity | 7 | 8.56 | 6.48 | 2.39 | 19.72 |
| Post Turbidity | 7 | 4.53 | 5.39 | 1.11 | 16.62 |

Descriptive statistics were performed on the sample data in order to compare the mean values of continuous variables by filter type (the categorical variable of interest in this study). The means procedure compares the means of the covariates for unfiltered, activated anthracite coal filtered, activated coconut husk charcoal filtered, and activated hemp filtered samples in the dataset. For example: $\log_{10}(E.\ Coli)$ was higher pre-filtration than post hemp filtration. In the case of the distribution of the categorical test variable (filter type), the distribution frequency is uniform (N=7 per filtration category for a total of 28 observations). The mean results for $\log_{10}(E.\ Coli)$ for pre-filtration, activated anthracite coal, activated coconut husk charcoal, and activated hemp were 2.25, 2.73, 2.70, and 1.77 respectively. For this reason, it was decided to proceed to hypothesis testing in the form of t-tests and determine if the separate means were significantly different.

Figure 7A:
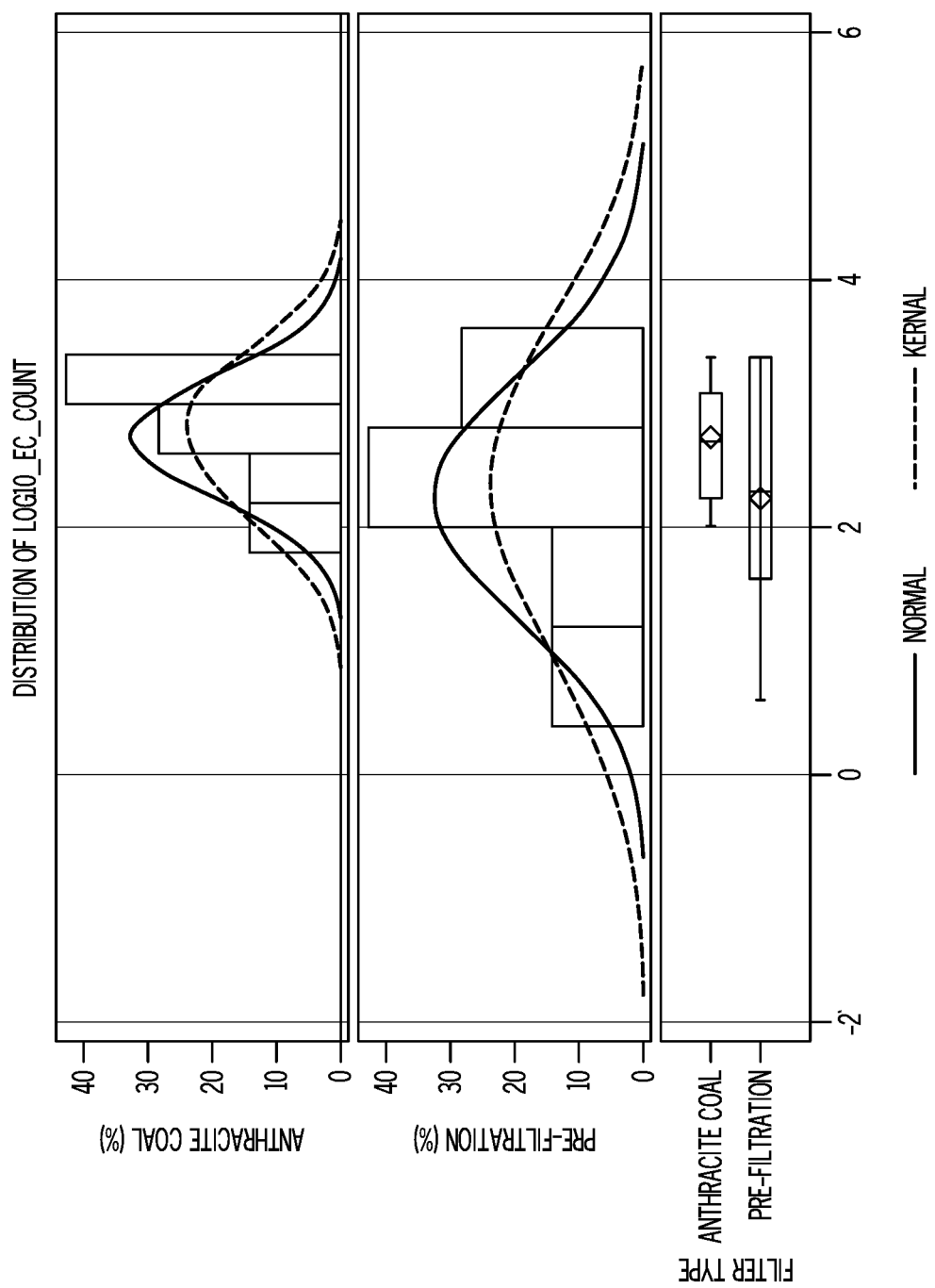
FIG. 7A depicts a graphic that illustrates the results of a two-tailed t-test used to determine whether there is a statistically significant difference in mean $\log_{10}(E.\ coli)$ between activated anthracite coal and pre-filtration according to one or more embodiments shown and described herein.
Figure 7B:
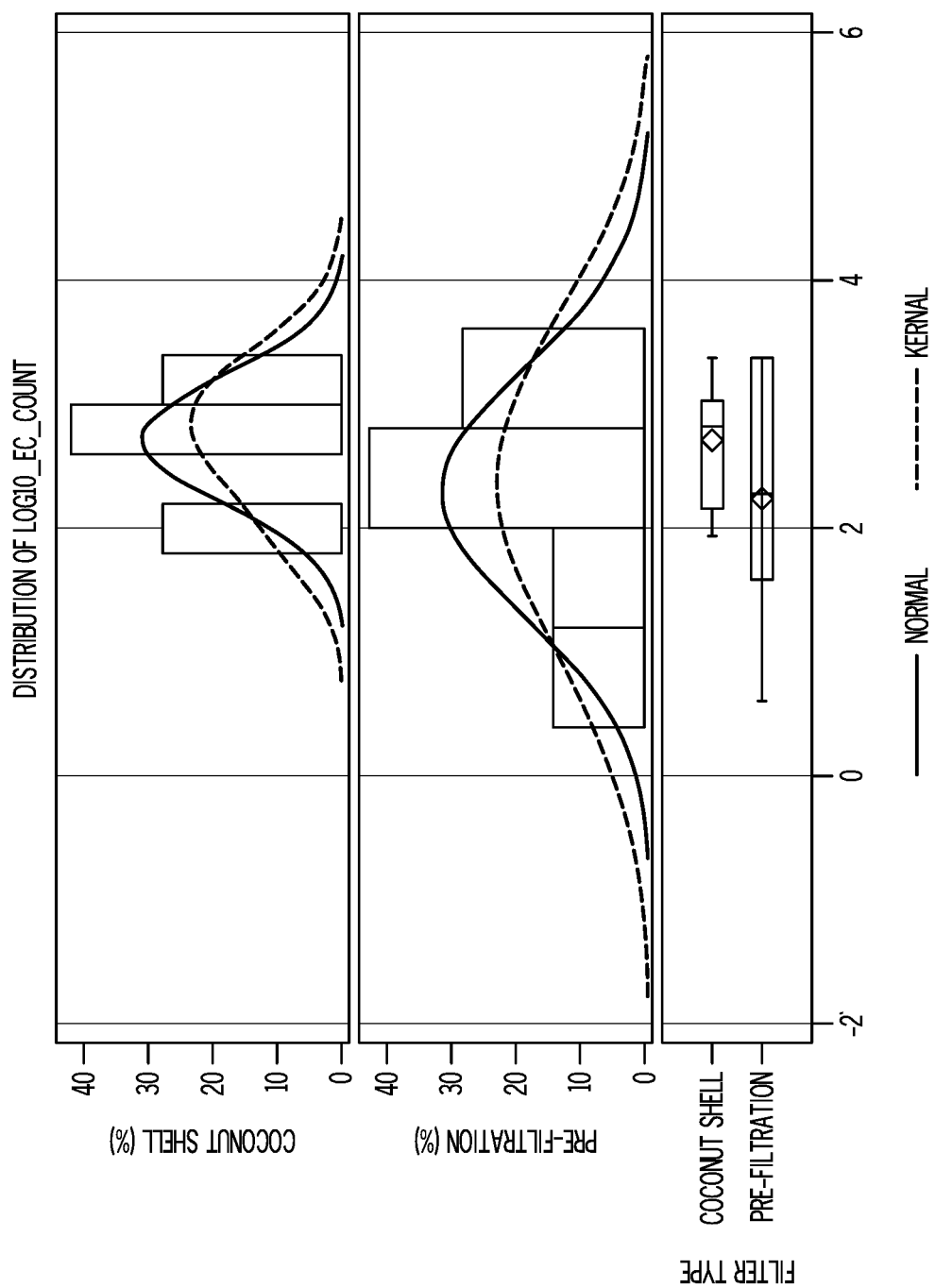
FIG. 7B depicts a graphic that illustrates the results of a two-tailed t-test used to determine whether there is a statistically significant difference in mean $\log_{10}(E.\ coli)$ between activated coconut husk charcoal and pre-filtration according to one or more embodiments shown and described herein.
Figure 7C:
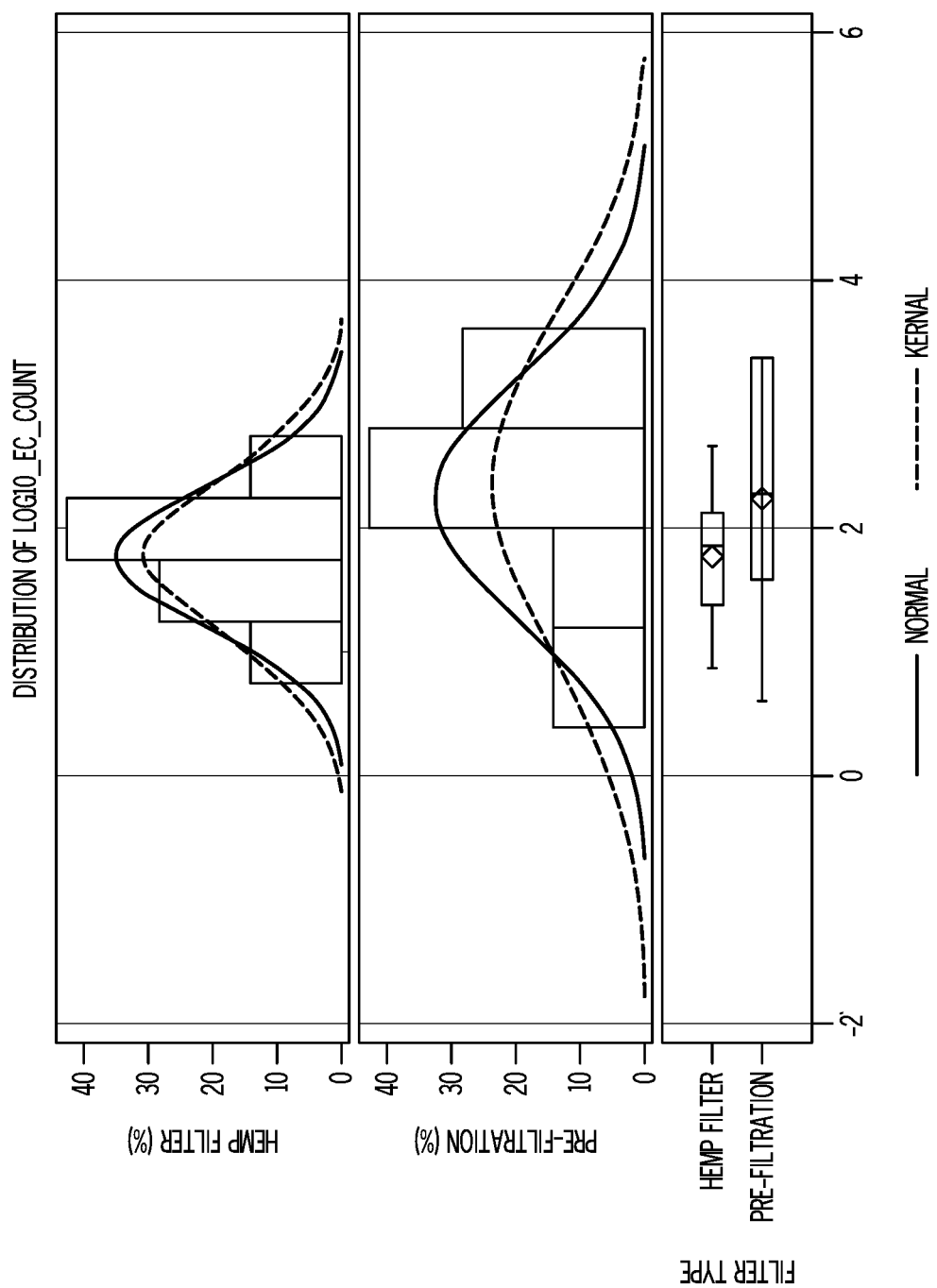
FIG. 7C depicts a graphic that illustrates the results of a two-tailed t-test used to determine whether there is a statistically significant difference in mean $\log_{10}(E.\ coli)$ between activated hemp and pre-filtration according to one or more embodiments shown and described herein.

FIG. 7A-7C and Tables 9-11 below illustrate the results of a two-tailed t-tests used to determine statistical significance according to one or more embodiments shown and described herein.

TABLE 9

T-Tests Activated Anthracite Coal Versus Untreated

Variable: Log10($E\ Coli$ Count)

| Filter Type | N | Mean | Std Dev | Std Err | Minimum | Maximum |
|---|---|---|---|---|---|---|
| Anthracite Coal | 7 | 2.73 | 0.49 | 0.18 | 2.01 | 3.38 |
| Pre Filtration | 7 | 2.25 | 0.98 | 0.37 | 0.61 | 3.38 |
| Diff (1-2) |  | 0.48 | 0.77 | 0.41 |  |  |

| Method | Variances | DF | t Value | Pr > \|t\| |
|---|---|---|---|---|
| Pooled | Equal | 12 | 1.17 | 0.26 |
| Satterthwaite | Unequal | 8.81 | 1.17 | 0.27 |

Equality of Variances

| Method | Num DF | Den DF | F Value | Pr > F |
|---|---|---|---|---|
| Folded F | 6 | 6 | 4.02 | 0.11 |

TABLE 10

T-Tests Activated Coconut Husk Charcoal Versus Untreated

Variable: Log10($E\ Coli$ Count)

| Filter Type | N | Mean | Std Dev | Std Err | Minimum | Maximum |
|---|---|---|---|---|---|---|
| Coconut shell | 7 | 2.71 | 0.50 | 0.19 | 1.93 | 3.38 |
| Pre Filtration | 7 | 2.25 | 0.98 | 0.37 | 0.61 | 3.38 |
| Diff (1-2) |   | 0.46 | 0.78 | 0.42 |   |   |

| Filter Type | Method | Mean | 95% CL Mean | | Std Dev | 95% CL Std Dev | |
|---|---|---|---|---|---|---|---|
| Coconut shell |   | 2.71 | 2.24 | 3.17 | 0.50 | 0.32 | 1.11 |
| Pre Filtration |   | 2.25 | 1.34 | 3.15 | 0.98 | 0.63 | 2.15 |
| Diff (1-2) | Pooled | 0.46 | −0.45 | 1.36 | 0.78 | 0.56 | 1.28 |
| Diff (1-2) | Satterthwaite | 0.46 | −0.48 | 1.40 |   |   |   |

| Method | Variances | DF | t Value | Pr > \|t\| |
|---|---|---|---|---|
| Pooled | Equal | 12 | 1.11 | 0.29 |
| Satterthwaite | Unequal | 8.97 | 1.11 | 0.30 |

Equality of Variances

| Method | Num DF | Den DF | F Value | Pr > F |
|---|---|---|---|---|
| Folded F | 6 | 6 | 3.77 | 0.13 |

TABLE 11

T-Tests-Hemp Charcoal Versus Untreated

Variable: Log10($E\ Coli$ Count)

| Filter Type | N | Mean | Std Dev | Std Err | Minimum | Maximum |
|---|---|---|---|---|---|---|
| Hemp Filter | 7 | 1.77 | 0.57 | 0.21 | 0.88 | 2.66 |
| Pre Filtration | 7 | 2.25 | 0.98 | 0.37 | 0.61 | 3.38 |
| Diff (1-2) |   | −0.47 | 0.80 | 0.43 |   |   |

| Filter Type | Method | Mean | 95% CL Mean | | Std Dev | 95% CL Std Dev | |
|---|---|---|---|---|---|---|---|
| Hemp Filter |   | 1.77 | 1.25 | 2.30 | 0.57 | 0.37 | 1.25 |
| Pre Filtration |   | 2.25 | 1.34 | 3.15 | 0.98 | 0.63 | 2.15 |
| Diff (1-2) | Pooled | −0.47 | −1.40 | 0.46 | 0.80 | 0.57 | 1.32 |
| Diff (1-2) | Satterthwaite | −0.47 | −1.43 | 0.49 |   |   |   |

| Method | Variances | DF | t Value | Pr > \|t\| |
|---|---|---|---|---|
| Pooled | Equal | 12 | −1.10 | 0.29 |
| Satterthwaite | Unequal | 9.64 | −1.10 | 0.30 |

Equality of Variances

| Method | Num DF | Den DF | F Value | Pr > F |
|---|---|---|---|---|
| Folded F | 6 | 6 | 2.96 | 0.21 |

In view of FIG. 7A-7C and Tables 9-11 above, two-tailed t-tests were used to determine if there was a significant difference in mean $\log_{10}(E.\ Coli)$ between anthracite, coconut shell, or hemp filtration versus pre-filtration mean $\log_{10}$ ($E.\ Coli$) as the baseline. For all of these comparisons on Table 11 the mean value for $\log_{10}(E.\ Coli)$ significantly decreased when hemp based filtration was performed ($\log_{10}$ ($E.\ Coli$)=1.77) versus pre filtration (log 10($E.\ Coli$)=2.25). However, the pvalue for the folded F test indicated unequal variance between the two categories (pre-filtered versus hemp filtered). Therefore, the Satterthwaite t-test was performed for unequal variance and the results were not significant (p-value=0.30). The other two comparisons also had unequal variance and were not significant, anthracite versus pre-filtered (p-value=0.27), coconut shell versus pre-filtered (p-value=0.30). In conclusion, the t-tests were deemed inadequate to test the study hypothesis because of possible confounders (such as pre-filtration pH) that could not be included in a t-test.

As such, in view of FIGS. 8, 9A-9I, 10 and Tables 12-14 below, an ANACOVA regression analysis was performed using SAS 9.3 statistical package. In particular the analysis used covariates to predict $\log_{10}(E.\ Coli)$. The number of observations read and the number of observations used were both 28. Statistical measures for goodness-of-fit using the R-square statistical measure were used to measure how close the data fit the regression line. Regression analysis on the final model estimates the relationship between the dependent variable, $\log_{10}(E.\ Coli)$ and the independent variables (filter type and pre-filtration pH). As seen in Table 12 below, fit statistics from regression analysis on the final model show an R-square value of 0.51 meaning this model explains 51 percent of variance.

TABLE 12

The GLM Procedure

Dependent Variable: Log10($E\ Coli$ Count)

| Source | DF | Sum of Squares | Mean Square | F Value | Pr > F |
|---|---|---|---|---|---|
| Model | 4 | 7.61 | 1.90 | 6.02 | 0.0018 |
| Error | 23 | 7.27 | 0.32 | | |
| Corrected Total | 27 | 14.88 | | | |

| R-Square | Coeff Var | Root MSE | Log10($E\ Coli$ Count) | Mean |
|---|---|---|---|---|
| 0.51 | 23.78 | 0.56 | | 2.36 |

| Source | DF | Type I SS | Mean Square | F Value | Pr > F |
|---|---|---|---|---|---|
| Filter Type | 3 | 4.28 | 1.43 | 4.51 | 0.013 |
| Pre-filtration pH | 1 | 3.34 | 3.34 | 10.55 | 0.004 |

| Parameter | Estimate | Baseline | Standard Error | t Value | Pr > |t| |
|---|---|---|---|---|---|
| Intercept | −5.92 | | 2.52 | −2.35 | 0.028 |
| Filter Type: Anthracite Coal | 0.48 | | 0.30 | 1.61 | 0.12 |
| Filter Type: Coconut shell | 0.46 | | 0.30 | 1.53 | 0.14 |
| Filter Type: Hemp Filter | −0.47 | | 0.30 | −1.57 | 0.13 |
| Filter Type: Pre-Filtration | 0.00 | | — | — | — |
| Pre-filtration pH | 1.03 | | 0.32 | 3.25 | 0.004 |

TABLE 13

T-Tests (Least Squares Difference) for $Log_{10}$($E\ Coli$ Count)
Means with the same letter are not significantly different.

| t Grouping | | Mean | N | Filter_Type |
|---|---|---|---|---|
| | A | 2.73 | 7 | Anthracite Coal |
| | A | | | |
| | A | 2.71 | 7 | Coconut shell |
| | A | | | |
| B | A | 2.25 | 7 | Pre-Filtration |
| B | | | | |
| B | | 1.77 | 7 | Hemp Filter |

TABLE 14

Filtration Type Effect: Power Estimate
Fixed Scenario Elements

| Method | Exact |
|---|---|
| Model | Fixed X |
| Number of Predictors in Full Model | 7 |
| Number of Test Predictors | 1 |
| Alpha | 0.05 |
| Partial Correlation | 0.22 |
| Total Sample Size | 28 |

In order to identify the model that best fit the sample population an ANACOVA (Analysis of Covariance) F-test was performed on each model. An ANACOVA is used to compare the means of more than two samples wen the independent variables are both continuous and categorical. In the F-test, the total variation in the data is subdivided into variation that is due to differences among the groups and variation that is due to differences within the groups. SAS computes the F-value into a p-value to test for model effects. A p-value that is greater than or equal to the alpha 0.05 confidence interval indicates the null hypothesis cannot be rejected. A p-value less than the 0.05 alpha confidence level indicates the null hypothesis can be rejected. The following results show variables for each model that fell below the 0.05 alpha confidence level.

Figure 8:
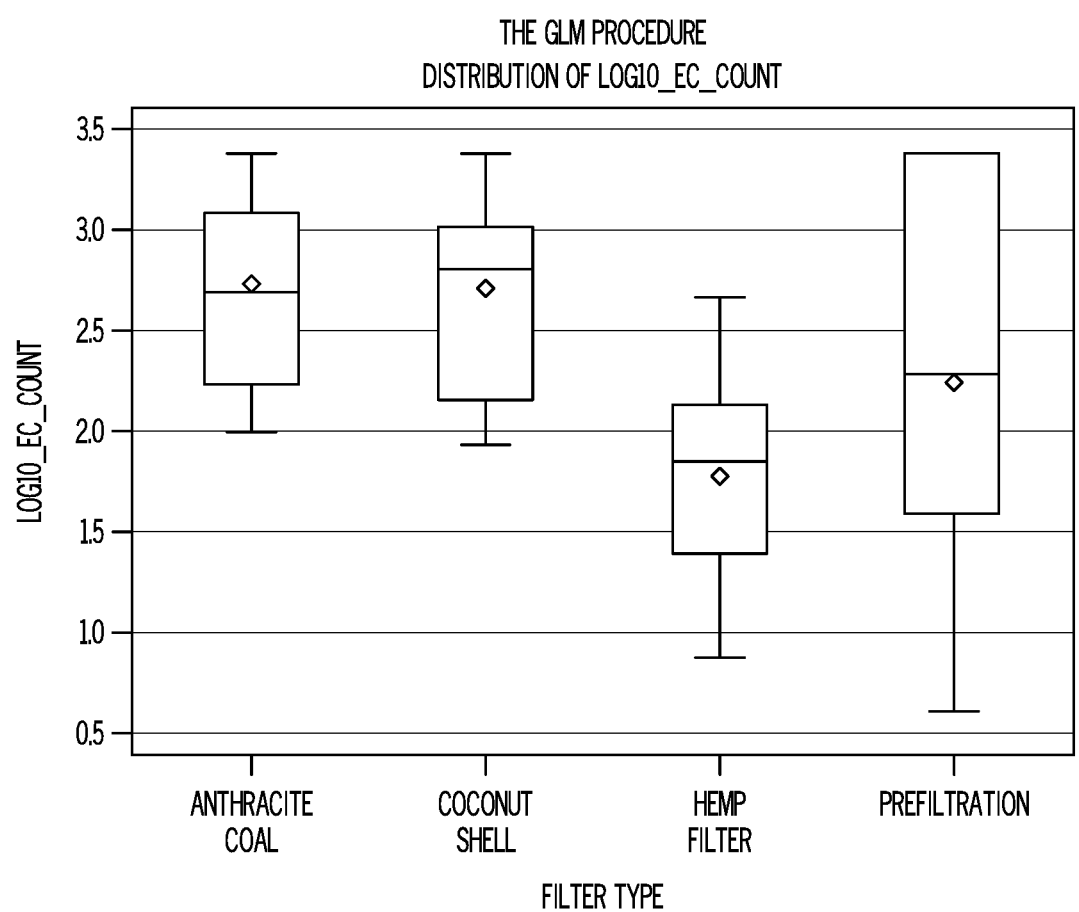
FIG. 8 depicts a graphic that illustrates the distribution of $\log_{10}(E.\ Coli)$ after hemp filtration when controlling for pH according to one or more embodiments shown and described herein.
Figure 9A:
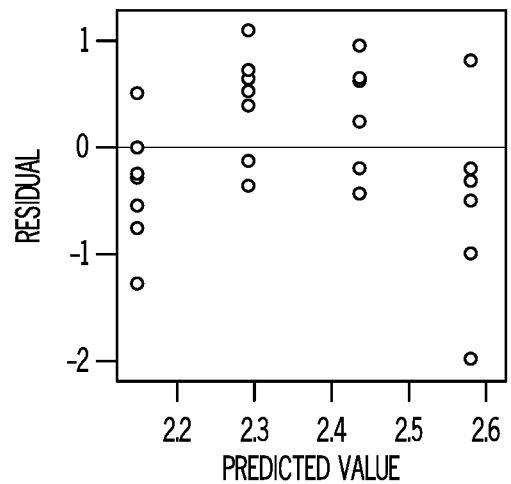
Figure 9B:
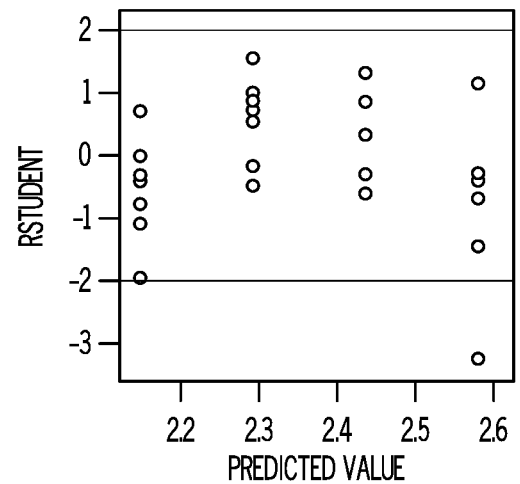
Figure 9C:
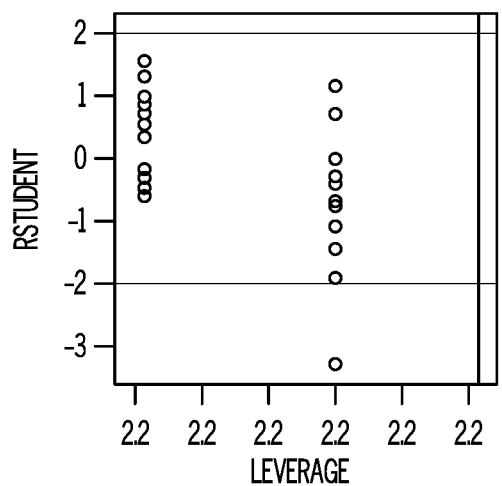
Figure 9D:
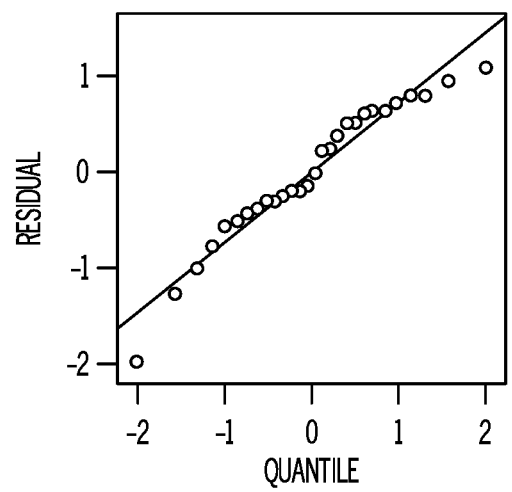
Figure 10:
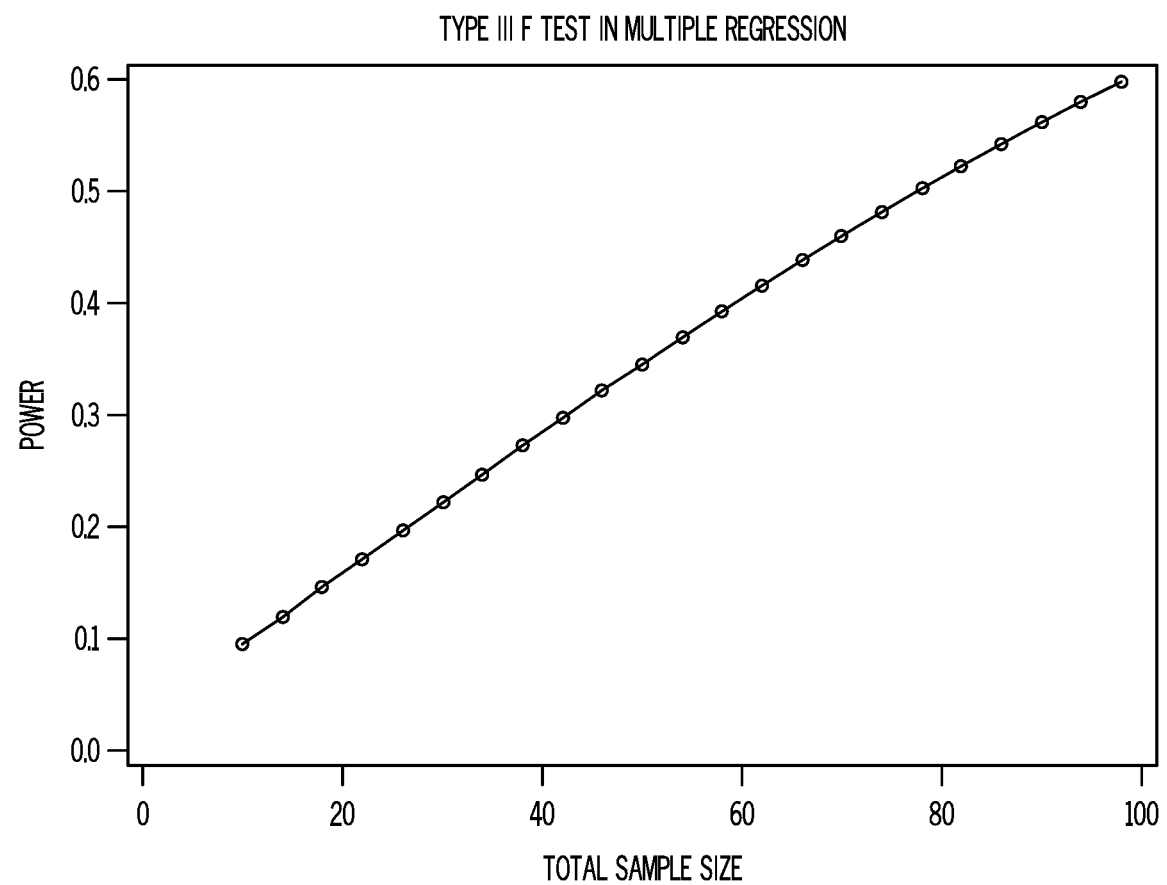
FIG. 10 depicts a graphic that illustrates a power estimate for the model according to one or more embodiments shown and described herein.

In sum, it was determined that the pH covariate is a statistically significant adjustment for the effect of hemp filtration on $log_{10}(E.\ Coli)$. The FIGS. 9A-9I show the fit diagnostics for the assumptions of the model passed normality of residuals, collinearity, and homogeneity of variance for the categorical predictor variable filter type. The Table 14 above shows that the power estimate or ability of the model to control for type 11 error (false negatives) was over 99% (FIG. 10). It was determined that the pH covariate is a statistically significant adjustment. For every unit increase in pH, the $log_{10}$ (CFU) increases by 1.03 units. The categorical test variable filter type has a statistically significant effect on $log_{10}(E.\ Coli)$ in comparison with pre-filtered water. Notably, when compared to the baseline of pre-filtration, hemp filtration has an effect of decreasing $log_{10}(E.\ Coli)$ by 0.48 units. FIG. 8 shows the distribution of $log_{10}(E.\ Coli)$ after hemp filtration when controlling for pH.

Other Applications/Uses of Raw and/or Activated Hemp

Uses of raw hemp and/or activated hemp include use in any type of filter, filtration device and/or filtration system, to filter a substance (e.g., water, air, engine oil, a liquid, gasoline, a gas, pharmaceutical stream purification, brackish water, sea water, chemical warfare agents, biological weapons/agents [e.g., nerve agents, mustard, sarin, VX, etc.]). According to various aspects, raw and/or activated hemp may be utilized as part of any type of personal protective equipment (PPE). PPE may include gas masks (e.g., Level A, B. C, and/or D level of protection). According to other aspects, raw and/or activated hemp may be utilized as part of any type of self-contained breathing apparatus (whether on Earth or outside of Earth's atmosphere). According to further aspects, raw and/or activated hemp may be utilized in any type of respirator, respirator device, and/or respirator system. According to other aspects, raw and/or activated hemp may be utilized in any type of chemical protective suit. According to further aspects, raw and/or activated hemp may be utilized in mine safety and health environments, hospital environments, radiological and/or radiation filtration environments, off-shore and/or on-land drilling environments (e.g. oil, gas, any natural resource), and commercial and/or military aircraft environments, each whether as part of a device/system or through the use of PPE. According to other aspects, raw and/or activated hemp may be utilized to update medical technologies and/or procedures (e.g., hemofusion, image-guided surgery, x-ray, neruo-surgery, radiotherapy, radiosurgery and/or the like). According to further aspects, raw and/or activated hemp may be utilized in gas sensor technology (e.g., thermal desorption products, gas chromatography, mass spectrometry). According to other aspects, raw and/or activated hemp may be utilized in any vehicle (e.g., car, plane, train, public transit systems) whether on Earth or in space (e.g., electrical charge key in no or low gravitational environments). According to further aspects, raw and/or activated hemp may be utilized in manufacturing (e.g., vehicle and/or vehicle component manufacturing, aerospace and/or aerospace component manufacturing, ship and/or ship component manufacturing, submarine and/or submarine component manufacturing, machine and/or machine component manufacturing). According to other aspects, raw and/or activated hemp may be utilized in emergency spill kit products. According to further aspects, raw and/or activated hemp may be utilized in devices/systems on-land, in-water, in space, in new and/or existing construction (e.g., absorbent pads, socks, and/or the like) According to other aspects, raw and/or activated hemp may be utilized in municipal water treatment systems. According to further aspects, raw and/or activated hemp may be utilized in any type of electrochemical energy storage, any type of showering system (e.g. filter), any type of testing and/or measuring equipment, any type of wastewater treatment system (e.g., radioactive), any type of water reuse system/device, any type of deepwell and/or wellhead system (e.g., shale oil and gas production), any type of nuclear waste treatment system. According to other aspects, raw and/or activated hemp may be utilized in any hazardous waste tank systems/devices, any landfill system, any spill prevention, control and countermeasure (SPCC) system/device, and any stack testing, filtration and dispersion system. According to further aspects, raw and/or activated hemp may be utilized in capsules and/or pills for improving patient health including intestinal gas, kidney health, and/or diarrhea. According to other aspects, raw and/or activated hemp may be utilized in antibacterial, antifungal, and/or detoxifying environments (e.g., teeth whitening products, oral health products, skin care products [e.g., lotions, cosmetics, hand sanitizers, deodorants, shampoos/conditioners, soaps], and/or kidney dialysis systems/devices. According to other aspects, raw and/or activated hemp may be utilized in combination with a natural resource material (e.g., soybean) for use in any type of military and/or public vehicle (e.g., land, above sea, below sea, in earth's atmosphere, in space) and/or any component thereof (e.g., body, frame, window, panel, etc.). For example, a mixture of soybean (e.g., 25%) and hemp (e.g., 75%) may be utilized to manufacture body panels. Notably, as referenced throughout this disclosure, hemp (raw and/or activated) may include, without limitation, any type or any strain of hemp (e.g., Fibranova and Carmagnola varieties, Italian dioiecious, etc.).

It should now be understood that the systems and methods described herein are suitable for obtaining activated hemp from raw hemp, which may be used for the purposes of filtering any fluids to remove undesirable components therefrom. Because activated hemp based filters are bio-based, they may provide adequate filtering capabilities without any harmful side effects associated with some chemical based solutions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A filter, comprising:

an enclosure;

an inlet;

an outlet fluidly coupled to the inlet; and a first filtering layer that comprises electrically charged activated hemp particles, wherein the activated hemp particles were created from raw hemp and further wherein the activated hemp particles are comprised of carbon atomic weight percentage of 0.31 or less, wherein the enclosure defines a flow path from the inlet, through the first filtering layer, and to the outlet to remove or reduce an element from a fluid flowing along the flow path.

2. The filter of claim 1, further comprising a second filtering layer.

3. The filter of claim 2, wherein the second filtering layer includes at least one of the following: a fibrous material, a screen, sand, pea gravel, or hemp.

4. The filter of claim 2, wherein the second filtering layer includes at least one of the following: powdered activated carbon (PAC), granular activated carbon (GAC), extruded activated carbon (EAC), bead activated carbon (BAC), impregnated carbon (IC), or polymer coated carbon (PCC).

5. The filter of claim 1, wherein the activated hemp particles comprise at least one of the following: powdered activated particles that pass through Mesh size no. 80, granular activated particles that pass through Mesh size no. 20, extruded activated particles with a diameter from about 0.8 mm to about 130 mm, bead activated particles with a diameter of from about 0.35 mm to about 0.80 mm, particles impregnated with iodine, silver, aluminum cations, manganese cations, zinc cations, iron cations, lithium cations or calcium cations, or biocompatible polymer coated particles.

6. The filter of claim 1, further comprising a third filtering layer.

7. The filter of claim 6, wherein the third filtering layer includes at least one of the following: a fibrous material, a screen, sand, pea gravel, or hemp.

8. The filter of claim 1, wherein the activated hemp particles are chemically impregnated with a chemical comprising at least one of the following: silver, an acid, a base, or a salt.

9. The filter of claim 8, wherein when the chemical comprises the acid, the acid comprises at least one of the following: phosphoric acid, methionine, lysine, or mono sodium glutamate.

10. The filter of claim 8, wherein when the chemical comprises the base, the base comprises at least one of the following: lithium hydroxide, sodium hydroxide, potassium hydroxide, rubidium hydroxide, cesium hydroxide, magnesium hydroxide, calcium hydroxide, sulfur hydroxide, strontium hydroxide, or barium hydroxide.

11. The filter of claim 8, wherein when the chemical comprises the salt, the salt comprises at least one of the following: calcium chloride or zinc chloride.

12. The filter of claim 1, wherein the activated hemp particles are activated via at least one of the following: in an oxidizing atmosphere, in a non-oxidizing atmosphere, in an atmosphere containing steam, in an atmosphere containing steam and nitrogen, or during a reactivating process.

13. The filter of claim 1, wherein the activated hemp particles are activated using between about 1 and about 10 of the following: amla seeds, almonds, agerntum, babool, bagasse, bamboo dust briq, bark, beehive briq, besaram, banmara, cashew shells, walnut shells, castor seed shells, any type of coal, cedar cones, coconut shells, coffee husks, coir pith, corn cob, corn cob waste, cotton shells, ficus, jute waste, katra ghass, labakshi, lantana, miscalthus (elephant grass), paddy straw, palm fronds, rice husk, rice char (ash), rice char, rice stem, rice busha, saw dust, soybean, sugarcane, tea waste, tobacco waste, thakalkanda, any type of wood, wheat stalk, and/or water hyacinth.

14. The filter of claim 1, wherein the activated hemp particles are washed using at least one of the following: water, acid, or via carbon impregnation.

15. The filter of claim 1, wherein the activated hemp particles are reactivated used hemp.

16. A filter, comprising:
an enclosure;
an inlet;
an outlet fluidly coupled to the inlet; and
a first filtering layer that comprises electrically charged activated hemp particles, wherein the activated hemp particles were created from reactivated used hemp and further wherein the activated hemp particles are comprised of carbon atomic weight percentage of 0.31 or less,
wherein the enclosure defines a flow path from the inlet, through the first filtering layer, and to the outlet to remove or reduce an element from a fluid flowing along the flow path.

17. A filter, comprising:
an enclosure;
an inlet;
an outlet fluidly coupled to the inlet;
a first filtering layer that comprises electrically charged activated hemp particles, wherein the activated hemp particles were created from reactivated used hemp and further wherein the activated hemp particles are comprised of carbon atomic weight percentage of 0.31 or less; and
a second filtering layer that comprises at least one of the following: a fibrous material, a screen, sand, pea gravel, or hemp,
wherein the enclosure defines a flow path from the inlet, through the first filtering layer, and to the outlet to remove or reduce an element from a fluid flowing along the flow path.

* * * * *